US012694576B2

(12) United States Patent
Malan et al.

(10) Patent No.: US 12,694,576 B2
(45) Date of Patent: Jul. 28, 2026

(54) DETERMINING OPTIMAL WATER SENSOR PLACEMENT USING MACHINE LEARNING

(71) Applicant: STATE FARM MUTUAL AUTOMOBILE INSURANCE COMPANY, Bloomington, IL (US)

(72) Inventors: Kyle Malan, Downs, IL (US); Sean Kingsbury, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 484 days.

(21) Appl. No.: 18/372,366

(22) Filed: Sep. 25, 2023

(65) Prior Publication Data

US 2024/0319683 A1      Sep. 26, 2024

Related U.S. Application Data

(60) Provisional application No. 63/495,422, filed on Apr. 11, 2023, provisional application No. 63/491,828, filed on Mar. 23, 2023.

(51) Int. Cl.
| | |
|---|---|
| G06T 11/00 | (2026.01) |
| G01F 23/22 | (2006.01) |
| G05B 13/02 | (2006.01) |
| G06T 7/70 | (2017.01) |
| H04L 51/02 | (2022.01) |

(52) U.S. Cl.
CPC .............. G06T 11/00 (2013.01); G01F 23/22 (2013.01); G05B 13/0265 (2013.01); G06T 7/70 (2017.01); H04L 51/02 (2013.01)

(58) Field of Classification Search
CPC ...... G06N 3/006; G06N 3/0464; G06N 3/088; G06N 3/09; G06N 3/092; G06N 3/098; G06N 5/01; G06T 7/70; G06T 11/00
See application file for complete search history.

(56) References Cited

U.S. PATENT DOCUMENTS

| | | |
|---|---|---|
| 10,042,341 B1 | 8/2018 | Jacob |
| 11,847,666 B1 | 12/2023 | Allen et al. |
| 2016/0019212 A1 | 1/2016 | Soldani |
| 2017/0322705 A1 | 11/2017 | Conway et al. |

(Continued)

OTHER PUBLICATIONS

"Will AI Models Like ChatGPT Take Your Insurance Job?" Life Annuity Specialist, Mar. 7, 2023, www.lifeannuityspecialist.com/pc/3965114/514174?all=true. Accessed Mar. 7, 2023.

(Continued)

*Primary Examiner* — Vincent H Tran
(74) *Attorney, Agent, or Firm* — MARSHALL, GERSTEIN & BORUN LLP

(57) ABSTRACT

Systems and methods disclosed herein relate to determining optimal placement location of one or more water sensors proximate a structure using machine learning. The machine learning model may be provided structure information for a structure at which the water sensors are to be placed, and generate an indication of the optimal placement location of the one or more water sensors proximate the structure. The optimal placement location of the water sensors may correspond to potential sources of water damage. A user device may receive the indication of the optimal placement location of the one or more water sensors proximate the structure to a user device.

20 Claims, 11 Drawing Sheets

(56) References Cited

U.S. PATENT DOCUMENTS

| 2022/0270230 A1 | 8/2022 | Zahid |
|---|---|---|
| 2023/0234233 A1 | 7/2023 | Goyal et al. |

OTHER PUBLICATIONS

Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk-floatbot-activity-7089664064603234304-60TU?utm_source=share&utm_medium=member_android> (2023).

Isenberg, The Compliance Tasks ChatGPT Can (and Can't) Handle, Ignites (published Apr. 3, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Morris, Morgan Stanley Developing Chatbot with OpenAI, Ignites (published Mar. 15, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

Smith, Insurer Zurich experiments with ChatGPT for claims and data mining, Financial Times (published Mar. 24, 2023).

Tuohy, What ChatGPT's Chores May Look Like in Life Insurance Industry, Life Annuity Specialist (published Apr. 21, 2023).

Wilson, Should Financial Services Companies Consider Open AI?, LIMRA.com MarketFacts (published Mar. 2023).

Figure 6:
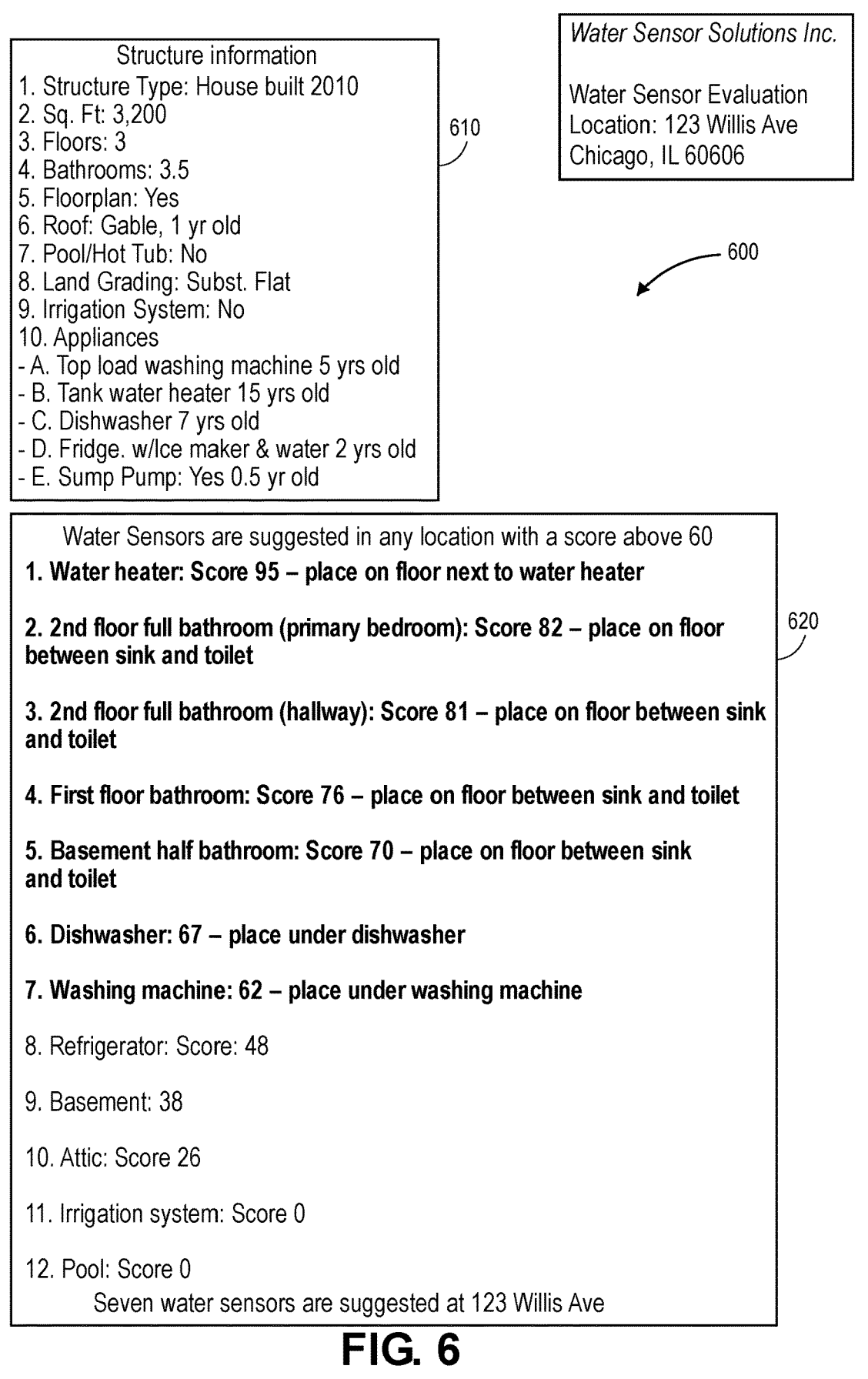

Structure information
1. Structure Type: House built 2010
2. Sq. Ft: 3,200
3. Floors: 3
4. Bathrooms: 3.5
5. Floorplan: Yes
6. Roof: Gable, 1 yr old
7. Pool/Hot Tub: No
8. Land Grading: Subst. Flat
9. Irrigation System: No
10. Appliances
- A. Top load washing machine 5 yrs old
- B. Tank water heater 15 yrs old
- C. Dishwasher 7 yrs old
- D. Fridge. w/Ice maker & water 2 yrs old
- E. Sump Pump: Yes 0.5 yr old

610

*Water Sensor Solutions Inc.*

Water Sensor Evaluation
Location: 123 Willis Ave
Chicago, IL 60606

600

Water Sensors are suggested in any location with a score above 60

1. Water heater: Score 95 – place on floor next to water heater

2. 2nd floor full bathroom (primary bedroom): Score 82 – place on floor between sink and toilet

3. 2nd floor full bathroom (hallway): Score 81 – place on floor between sink and toilet

4. First floor bathroom: Score 76 – place on floor between sink and toilet

5. Basement half bathroom: Score 70 – place on floor between sink and toilet

6. Dishwasher: 67 – place under dishwasher

7. Washing machine: 62 – place under washing machine

8. Refrigerator: Score: 48

9. Basement: 38

10. Attic: Score 26

11. Irrigation system: Score 0

12. Pool: Score 0

Seven water sensors are suggested at 123 Willis Ave

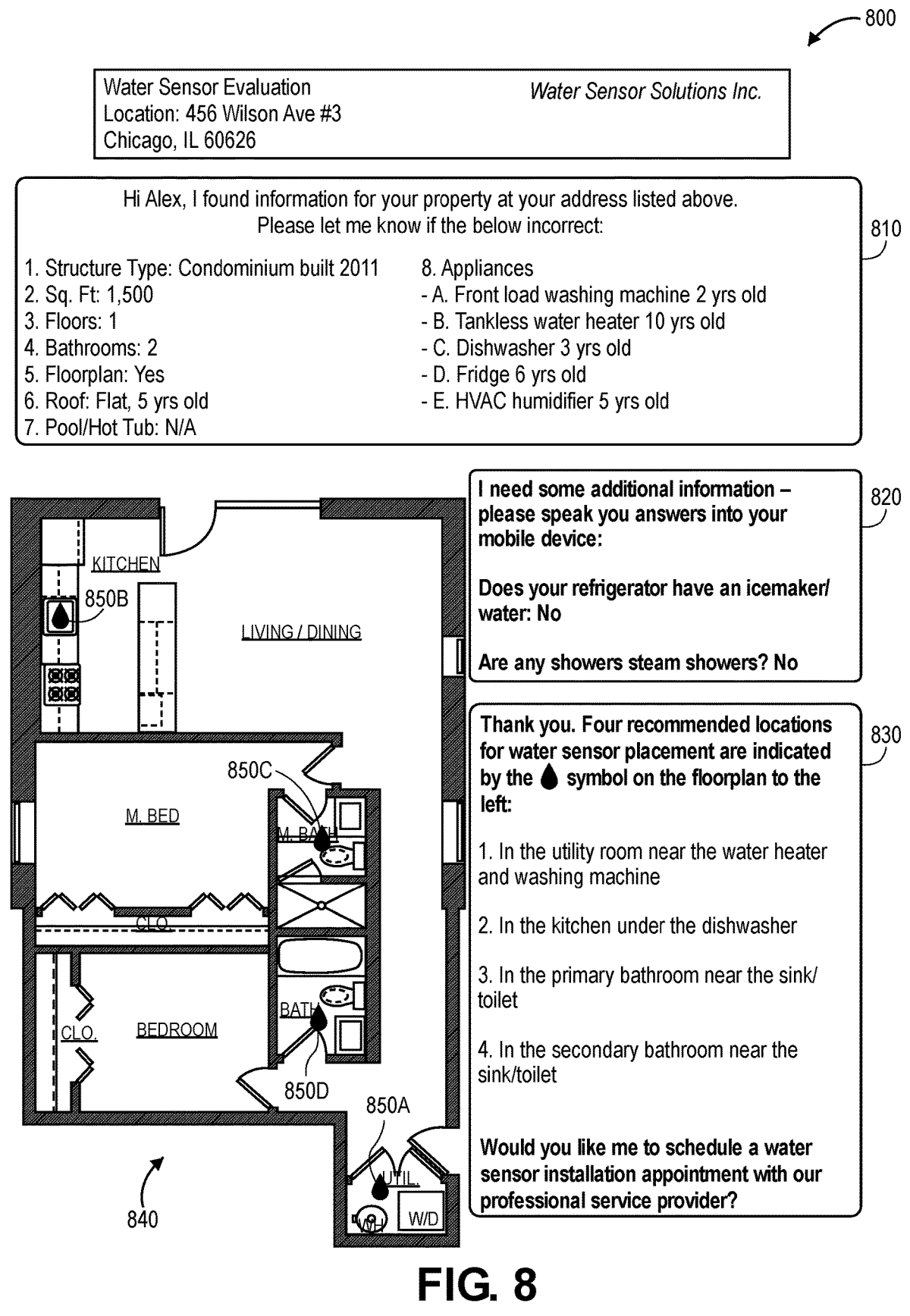

Water Sensor Evaluation                    *Water Sensor Solutions Inc.*
Location: 456 Wilson Ave #3
Chicago, IL 60626

Hi Alex, I found information for your property at your address listed above.
Please let me know if the below incorrect:                                      810

1. Structure Type: Condominium built 2011       8. Appliances
2. Sq. Ft: 1,500                                - A. Front load washing machine 2 yrs old
3. Floors: 1                                    - B. Tankless water heater 10 yrs old
4. Bathrooms: 2                                 - C. Dishwasher 3 yrs old
5. Floorplan: Yes                               - D. Fridge 6 yrs old
6. Roof: Flat, 5 yrs old                        - E. HVAC humidifier 5 yrs old
7. Pool/Hot Tub: N/A

I need some additional information –        820
please speak you answers into your
mobile device:

Does your refrigerator have an icemaker/
water: No

Are any showers steam showers? No

Thank you. Four recommended locations        830
for water sensor placement are indicated
by the ◆ symbol on the floorplan to the
left:

1. In the utility room near the water heater
and washing machine

2. In the kitchen under the dishwasher

3. In the primary bathroom near the sink/
toilet

4. In the secondary bathroom near the
sink/toilet

Would you like me to schedule a water
sensor installation appointment with our
professional service provider?

KITCHEN
850B
LIVING / DINING
850C
M. BED
M. BATH
CLO.
CLO.    BEDROOM    BATH
850D
850A
UTIL.
W/D
840

FIG. 8

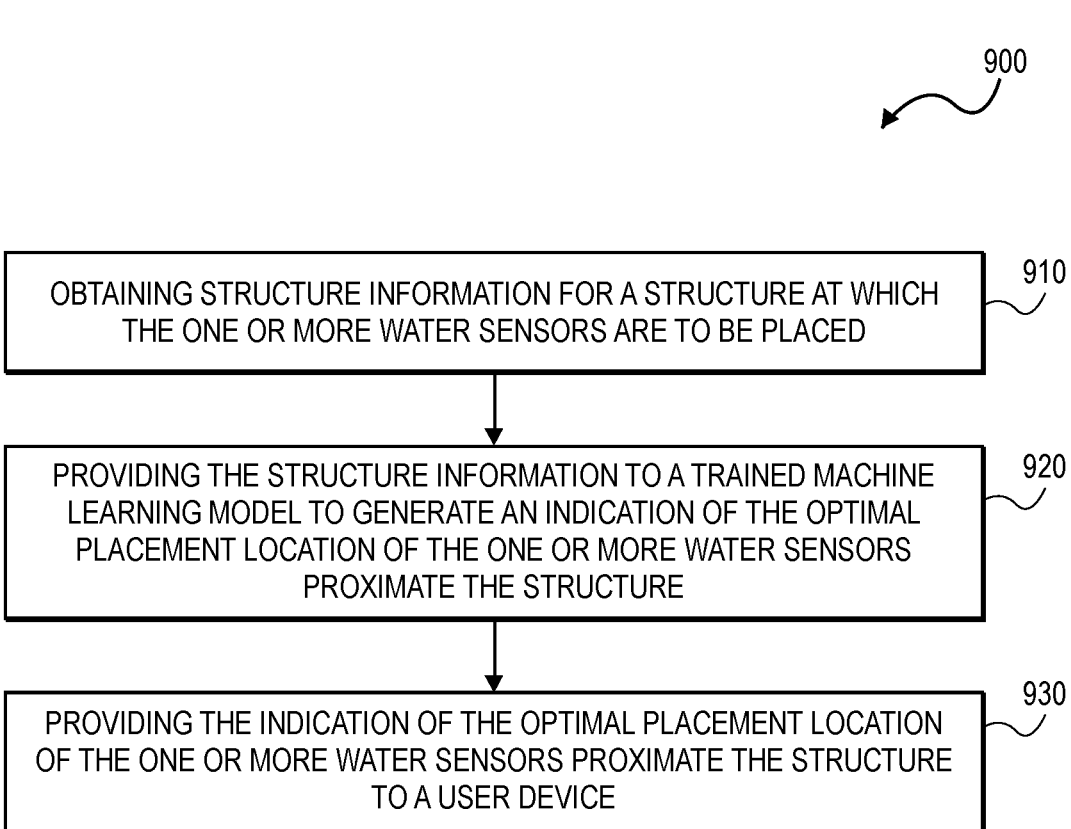

900

OBTAINING STRUCTURE INFORMATION FOR A STRUCTURE AT WHICH THE ONE OR MORE WATER SENSORS ARE TO BE PLACED

910

PROVIDING THE STRUCTURE INFORMATION TO A TRAINED MACHINE LEARNING MODEL TO GENERATE AN INDICATION OF THE OPTIMAL PLACEMENT LOCATION OF THE ONE OR MORE WATER SENSORS PROXIMATE THE STRUCTURE

920

PROVIDING THE INDICATION OF THE OPTIMAL PLACEMENT LOCATION OF THE ONE OR MORE WATER SENSORS PROXIMATE THE STRUCTURE TO A USER DEVICE

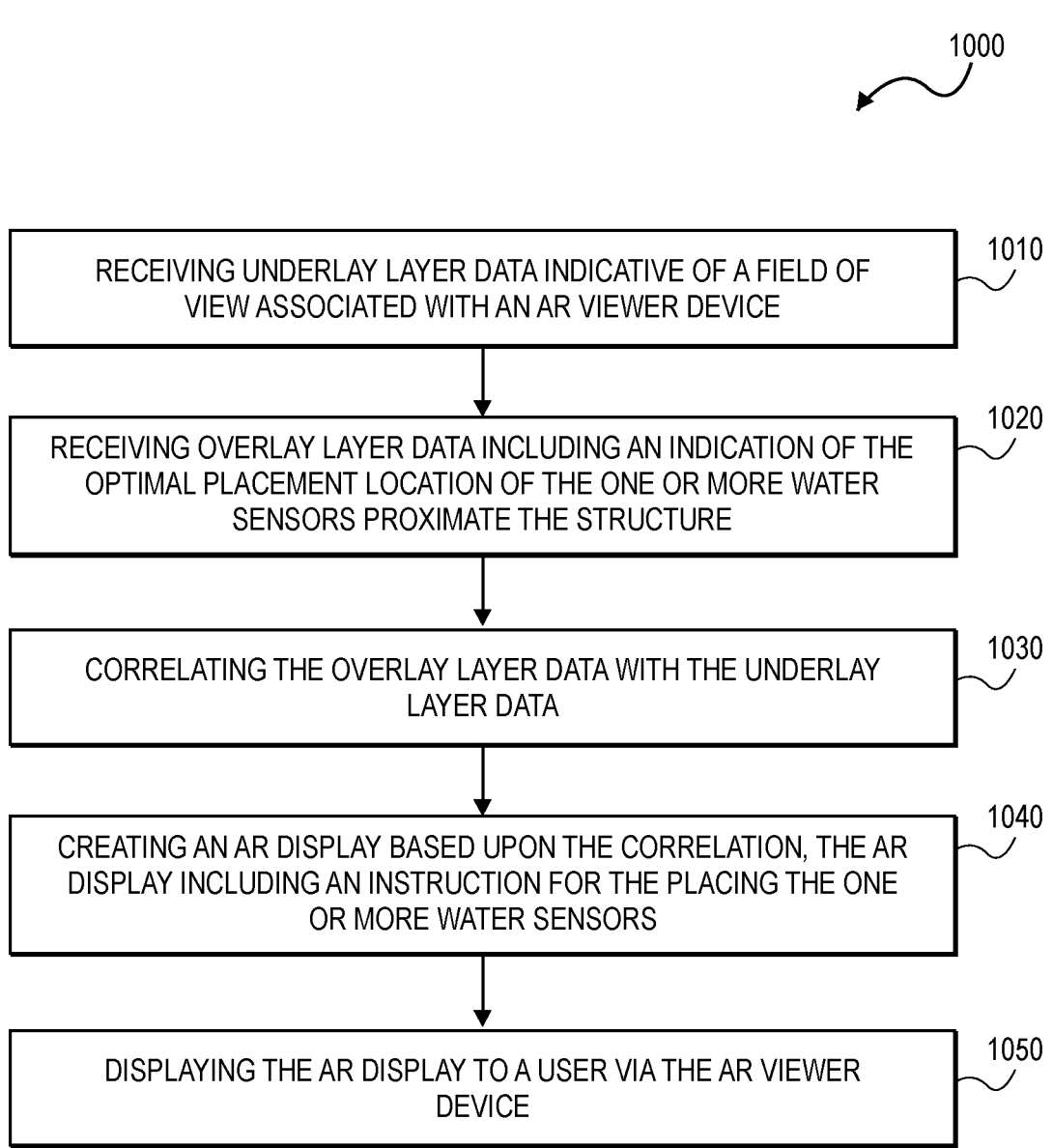

1000

RECEIVING UNDERLAY LAYER DATA INDICATIVE OF A FIELD OF VIEW ASSOCIATED WITH AN AR VIEWER DEVICE — 1010

RECEIVING OVERLAY LAYER DATA INCLUDING AN INDICATION OF THE OPTIMAL PLACEMENT LOCATION OF THE ONE OR MORE WATER SENSORS PROXIMATE THE STRUCTURE — 1020

CORRELATING THE OVERLAY LAYER DATA WITH THE UNDERLAY LAYER DATA — 1030

CREATING AN AR DISPLAY BASED UPON THE CORRELATION, THE AR DISPLAY INCLUDING AN INSTRUCTION FOR THE PLACING THE ONE OR MORE WATER SENSORS — 1040

DISPLAYING THE AR DISPLAY TO A USER VIA THE AR VIEWER DEVICE — 1050

FIG. 10

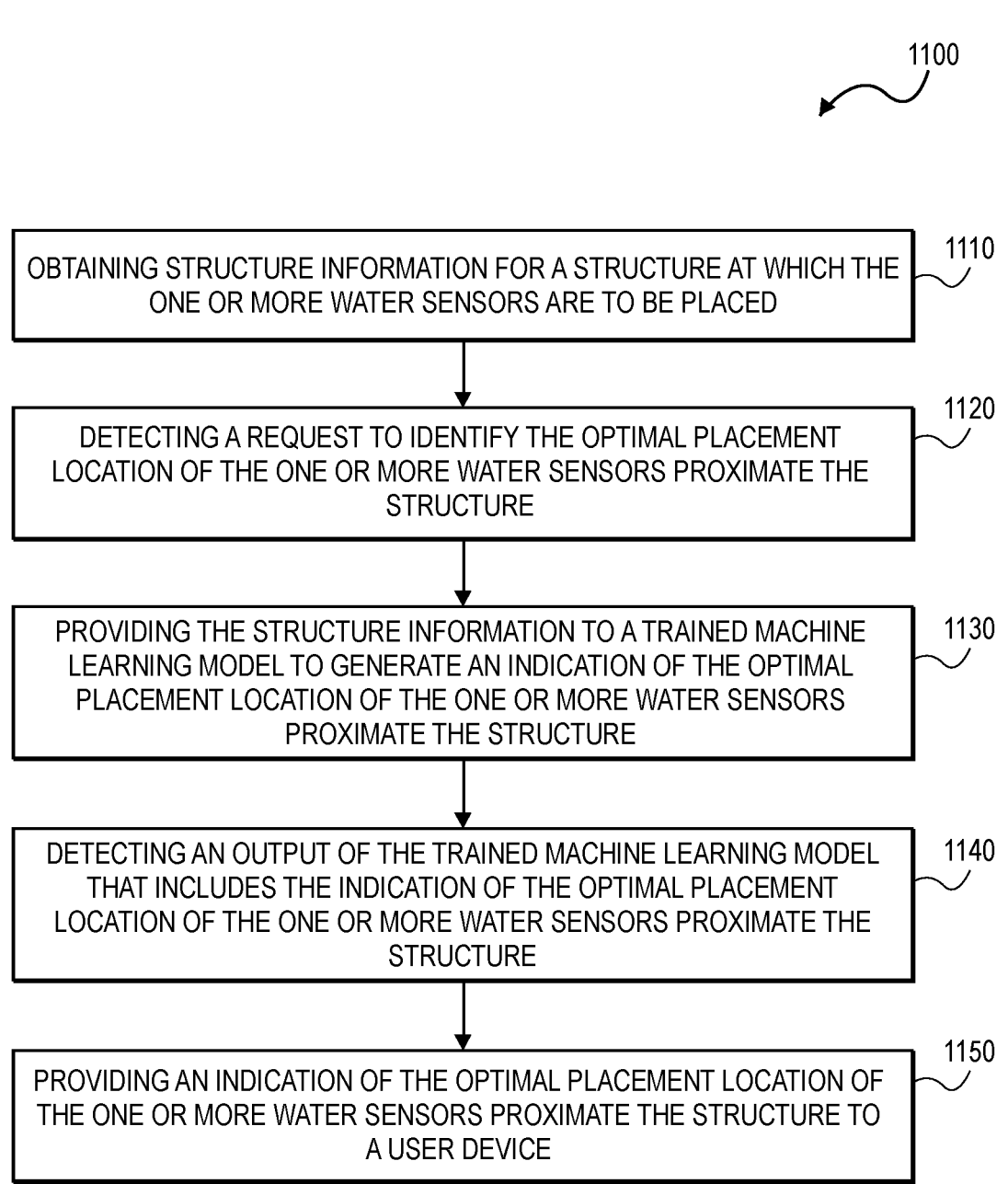

1100

OBTAINING STRUCTURE INFORMATION FOR A STRUCTURE AT WHICH THE ONE OR MORE WATER SENSORS ARE TO BE PLACED — 1110

DETECTING A REQUEST TO IDENTIFY THE OPTIMAL PLACEMENT LOCATION OF THE ONE OR MORE WATER SENSORS PROXIMATE THE STRUCTURE — 1120

PROVIDING THE STRUCTURE INFORMATION TO A TRAINED MACHINE LEARNING MODEL TO GENERATE AN INDICATION OF THE OPTIMAL PLACEMENT LOCATION OF THE ONE OR MORE WATER SENSORS PROXIMATE THE STRUCTURE — 1130

DETECTING AN OUTPUT OF THE TRAINED MACHINE LEARNING MODEL THAT INCLUDES THE INDICATION OF THE OPTIMAL PLACEMENT LOCATION OF THE ONE OR MORE WATER SENSORS PROXIMATE THE STRUCTURE — 1140

PROVIDING AN INDICATION OF THE OPTIMAL PLACEMENT LOCATION OF THE ONE OR MORE WATER SENSORS PROXIMATE THE STRUCTURE TO A USER DEVICE — 1150

FIG. 11

DETERMINING OPTIMAL WATER SENSOR PLACEMENT USING MACHINE LEARNING

CROSS-REFERENCE TO RELATED APPLICATIONS

This application claims priority to and the benefit of the filing date of: (1) provisional U.S. Patent Application No. 63/491,828 entitled "Systems and Methods for Optimizing Water Sensor Placement," filed on Mar. 23, 2023; and (2) provisional U.S. Patent Application No. 63/495,422 entitled "Systems and Methods for Optimizing Water Sensor Placement," filed on Apr. 11, 2023. The entire contents of each of which is hereby expressly incorporated herein by reference.

FIELD OF THE INVENTION

The present disclosure generally relates to water sensor placement, and more particularly, optimizing water sensor placement using machine learning.

BACKGROUND

Installing water sensors within a home, business and/or other structure may be a valuable tool to mitigate and/or avoid water damage. Although there may be generic recommendations associated with where to place one or more water sensors based upon assumed risks, a structure may have unique considerations which may determine the effectiveness of placing a water sensor in a particular location. Such considerations may include the layout of the structure, the type and condition of the appliances within the structure, a quantity of water sensors that may be ideal for the size and configuration of the structure, among other things. Installing too few water sensors and/or water sensors in less-than-optimal locations may decrease the effectiveness of the water sensors, if not render them entirely ineffective.

The conventional water sensor placement techniques may include additional ineffectiveness, inefficiencies, encumbrances, and/or other drawbacks.

SUMMARY

The present embodiments may relate to, inter alia, systems and methods for optimizing water sensor placement using machine learning and/or historical water damage claims data.

In one aspect, a computer-implemented method for determining an optimal placement of one or more water sensors proximate a structure using machine learning may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer-implemented method may include: (1) obtaining, by one or more processors, structure information for a structure at which the one or more water sensors are to be placed; (2) providing, by the one or more processors, the structure information to a trained machine learning model to generate an indication of the optimal placement location of the one or more water sensors proximate the structure, wherein (i) the trained machine learning model may be trained using historical water damage claims data, (ii) the historical water damage claims data may include a geographic location of a structure associated with the corresponding historical water damage claims data, (iii) the trained machine learning model may be configured to learn a relationship between building code requirements for the geographic locations and potential sources of water damage, and/or (iv) the optimal placement location of the one or more water sensors may correspond to the potential sources of water damage; and/or (3) providing, by the one or more processors, the indication of the optimal placement location of the one or more water sensors proximate the structure to a user device. The method may include additional, less, or alternate functionality or actions, including those discussed elsewhere herein.

In another aspect, a computer system for determining an optimal placement of one or more water sensors proximate a structure using machine learning may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computer system may include one or more processors configured to: (1) obtain structure information for a structure at which the one or more water sensors are to be placed; (2) provide the structure information to a trained machine learning model to generate an indication of the optimal placement location of the one or more water sensors proximate the structure, wherein (i) the trained machine learning model may be trained using historical water damage claims data, (ii) the historical water damage claims data may include a geographic location of a structure associated with the corresponding historical water damage claims data, (iii) the trained machine learning model may be configured to learn a relationship between building code requirements for the geographic locations and potential sources of water damage, and/or (iv) the optimal placement location of the one or more water sensors may correspond to the potential sources of water damage; and/or (3) provide the indication of the optimal placement location of the one or more water sensors proximate the structure to a user device. The computer system may include additional, less, or alternate functionality, including that discussed elsewhere herein.

In one aspect, a non-transitory computer-readable medium storing processor-executable instructions that, when executed by one or more processors, cause the one or more processors to: (1) obtain structure information for a structure at which one or more water sensors are to be placed; (2) provide the structure information to a trained machine learning model to generate an indication of an optimal placement location of the one or more water sensors proximate the structure, wherein: (i) the trained machine learning model may be trained using historical water damage claims data, (ii) the historical water damage claims data may include a geographic location of a property associated with the corresponding historical water damage claims data, (iii) the trained machine learning model may be configured to learn a relationship between building code requirements for the geographic locations and potential sources of water damage, and/or (iv) the optimal placement location of the one or more water sensors may correspond to the potential sources of water damage; and/or (3) provide the indication of the optimal placement location of the one or more water sensors proximate the structure to a user device. The instructions may direct additional, less, or alternate functionality, including that discussed elsewhere herein.

In one aspect, a computer-implemented method of using Augmented Reality (AR) (or other display or display screen) for visualizing an optimal placement location of one or more water sensors proximate a structure may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer-implemented method may include: (1) receiving, with one or more processors, underlay layer data indicative of a field of view associated with an AR viewer device; (2) receiving, with the one or more processors, overlay layer data including an indication of the optimal placement location of the one or more water sensors proximate the structure; (3) correlating, with the one or more processors, the overlay layer data with the underlay layer data; (4) creating, with the one or more processors, an AR display based upon the correlation, the AR display including an instruction for the placing the one or more water sensors; and/or (5) displaying, with the one or more processors, the AR display to a user via the AR viewer device. The method may include additional, less, or alternate functionality or actions, including those discussed elsewhere herein.

In another aspect, a computer system to use Augmented Reality (AR) (or other display or display screen) to visualize visualizing an optimal placement location of one or more water sensors proximate a structure may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computer system may include one or more processors configured to: (1) receive underlay layer data indicative of a field of view associated with an AR viewer device; (2) receive overlay layer data including an indication of the optimal placement location of the one or more water sensors proximate the structure; (3) correlate the overlay layer data with the underlay layer data; (4) create an AR display based upon the correlation, the AR display including an instruction for the placing the one or more water sensors; and/or (5) display the AR display to a user via the AR viewer device. The computer system may include additional, less, or alternate functionality, including that discussed elsewhere herein.

In one aspect, a non-transitory computer-readable medium storing processor-executable instructions that, when executed by one or more processors, cause the one or more processors to: (1) receive underlay layer data indicative of a field of view associated with an AR viewer device (or other display or display screen); (2) receive overlay layer data including an indication of the optimal placement location of the one or more water sensors proximate the structure; (3) correlate the overlay layer data with the underlay layer data; (4) create an AR display based upon the correlation, the AR display including an instruction for the placing the one or more water sensors; and/or (5) display the AR display to a user via the AR viewer device. The instructions may direct additional, less, or alternate functionality, including that discussed elsewhere herein In one aspect, a computer-implemented method for determining an optimal placement location of one or more water sensors proximate a structure using a machine learning (ML) chatbot may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer-implemented method may include: (1) obtaining, by one or more processors, structure information for a structure at which the one or more water sensors are to be placed; (2) detecting, by the one or more processors via the ML chatbot, a request to identify the optimal placement location of the one or more water sensors proximate the structure; (3) in response to detecting the request, providing, by the one or more processors, the structure information to a trained machine learning model to generate an indication of the optimal placement location of the one or more water sensors proximate the structure, wherein: (i) the trained machine learning model is trained using historical water damage claims data, (ii) the optimal placement location of the one or more water sensors corresponds to the potential sources of water damage, and/or (iii) the ML chatbot is configured to input the structure information into the ML chatbot to provide the structure information to the trained machine learning model; (4) detecting, by the one or more processors via the ML chatbot, an output of the trained machine learning model that includes the indication of the optimal placement location of the one or more water sensors proximate the structure; and/or (5) providing, by the one or more processors, an indication of the optimal placement location of the one or more water sensors proximate the structure to a user device. The method may include additional, less, or alternate functionality or actions, including those discussed elsewhere herein.

In another aspect, a computer system to determine an optimal placement location of one or more water sensors proximate a structure using a machine learning (ML) chatbot may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computer system may include one or more processors configured to: (1) obtain structure information for a structure at which the one or more water sensors are to be placed; (2) detect a request to identify the optimal placement location of the one or more water sensors proximate the structure; (3) in response to detecting the request, provide the structure information to a trained machine learning model to generate an indication of the optimal placement location of the one or more water sensors proximate the structure, wherein: (i) the trained machine learning model is trained using historical water damage claims data, (ii) the optimal placement location of the one or more water sensors corresponds to the potential sources of water damage, and/or (iii) the ML chatbot is configured to input the structure information into the ML chatbot to provide the structure information to the trained machine learning model; (4) detect an output of the trained machine learning model that includes the indication of the optimal placement location of the one or more water sensors proximate the structure; and/or (5) provide an indication of the optimal placement location of the one or more water sensors proximate the structure to a user device. The computer system may include additional, less, or alternate functionality, including that discussed elsewhere herein.

In one aspect, a non-transitory computer-readable medium storing processor-executable instructions that, when executed by one or more processors, cause the one or more processors to: (1) obtain structure information for a structure at which the one or more water sensors are to be placed; (2) detect a request to identify the optimal placement location of the one or more water sensors proximate the structure; (3) in response to detecting the request, provide the structure information to a trained machine learning model to generate an indication of the optimal placement location of the one or more water sensors proximate the structure, wherein: (i) the trained machine learning model is trained using historical water damage claims data, (ii) the optimal placement location of the one or more water sensors corresponds to the potential sources of water damage, and/or (iii) the ML chatbot is configured to input the structure information into the ML chatbot to provide the structure information to the trained machine learning model; (4) detect an output of the trained machine learning model that includes the indication of the optimal placement location of the one or more water sensors proximate the structure; and/or (5) provide an indication of the optimal placement location of the one or more water sensors proximate the structure to a user device. The instructions may direct additional, less, or alternate functionality, including that discussed elsewhere herein Additional, alternate and/or fewer actions, steps, features and/or functionality may be included in an aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 6 depicts an exemplary list identifying optimized placement locations of water sensors proximate a home, according to one embodiment.

FIG. 8 depicts an exemplary display employing an ML chatbot for determining optimized placement locations of water sensors proximate a home, according to one embodiment.

FIG. 9 depicts a flow diagram of an exemplary computer-implemented method for determining an optimal placement location of water sensors using ML.

FIG. 10 depicts a flow diagram of an exemplary computer-implemented method of using ar for visualizing an optimal placement location of water sensors using ML.

FIG. 11 depicts a flow diagram of an exemplary computer-implemented method for determining an optimal placement location of water sensors using an ML chatbot.

Figure 1:
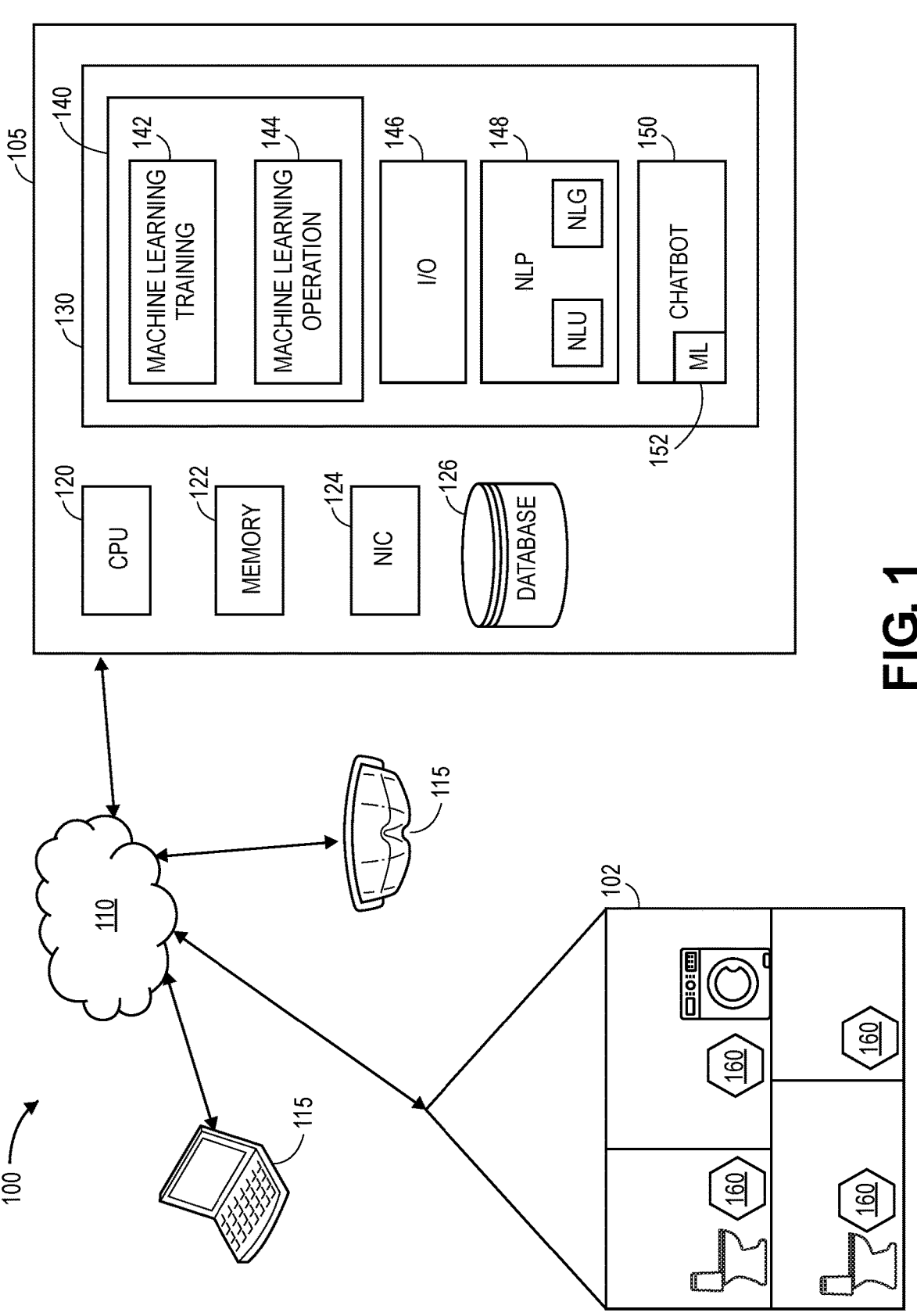
FIG. 1 depicts a block diagram of an exemplary computer environment in which methods and systems for determining optimal placement locations of water sensors are implemented.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The computer systems and methods disclosed herein generally relate to, inter alia, (1) methods and systems for determining an optimal placement of one or more water sensors proximate a structure using machine learning (ML) and/or other processor analysis of historical claims data, including text, documents, and/or images related to water damage in and around homes or other buildings; (2) methods and systems for using Augmented Reality (AR) (or other displays, display screens, images, graphics, holographs, or electronic or computer displays) for visualizing an optimal placement location of one or more water sensors proximate a structure; and/or (3) methods and systems for determining an optimal placement location of one or more water sensors proximate a structure using an ML chatbot/voice bot and/or artificial intelligence (AI) chatbot/voice bot.

Some embodiments may use techniques to obtain structure information for a structure at which the one or more water sensors are to be placed. The structure information may include the geographic location of the structure and/or data associated with one or more of a floorplan of the structure, structural components of the structure, a property the structure is located upon, plumbing at the structure, and/or appliances at the structure. The structure information may be provided to a trained ML model to generate an indication of the optimal placement location of the one or more water sensors proximate the structure. The ML model may include a regression model, an algorithm such as k-nearest neighbor, support vector regression, and/or random forest.

The trained ML model may be trained using historical water damage claims data. The historical water damage claims data may indicate one or more of a source of water damage (e.g., a pipe, a water connection, external water source, an appliance leaking, etc.); a cause of the water damage (e.g., a frozen pipe, a clogged toilet, a broken fitting, a broken pipe, etc.), a location of the water damage (e.g., bathroom, basement, attic, garage, etc.), and/or a type of structure where the water damage occurred (e.g., single family home, condominium, garage, etc.), among other things. The historical water damage claims data may include a geographic location of a structure associated with the corresponding historical water damage claims data. The trained ML model may be configured to learn a relationship between building code requirements for the geographic locations and potential sources of water damage. Potential placement locations of the one or more water sensors may correspond to the potential sources of water damage, with the most optimal placement location corresponding to the most likely potential source of water damage.

The ML model may be configured to weight one or more attributes of the structure information and/or determine a score associated with the potential sources of water damage and rank the potential sources of water damage.

The system and methods may determine a number of water sensors to place proximate the structure and provide a number of ranked potential sources of water damage which correspond to the number of water sensors to place proximate the structure. The systems and methods may remove one or more optimal placement locations which do not exist at the structure.

The indication of the optimal placement location of the one or more water sensors proximate the structure may be provided to a user device. For instance, a bot, application, and/or computing device may generate verbal, audio, visual, graphical, and/or textual output for user consumption that details one or more optimal placement of several water sensors about a dwelling or home.

In some embodiments, generative AI models (also referred to as generative ML models) including voice bots and/or chatbots may be configured to utilize artificial intelligence and/or ML techniques. Data input into the voice bots, chatbots, or other bots may include historical insurance claim data, historical home data, historical water damage data, sensor information, damage mitigation and prevention techniques, and other data. The data input into the bot or bots may include text, documents, and images, such as text, documents and images related to homes, claims, and water damage, damage mitigation and prevention, and sensors. In certain embodiments, a voice or chatbot may be a ChatGPT chatbot. The voice or chatbot may employ supervised or unsupervised ML techniques, which may be followed or used in conjunction with reinforced or reinforcement learning techniques. In one aspect, the voice or chatbot may employ the techniques utilized for ChatGPT. The voice bot, chatbot, ChatGPT-based bot, ChatGPT bot, and/or other such generative model may generate audible or verbal output, text or textual output, visual or graphical output, output for use with speakers and/or display screens, and/or other types of output for user and/or other computer or bot consumption.

As used herein, the term augmented reality (AR) may refer to generating digital content (i.e., an AR display) which is overlaid on a view of the user's physical environment via a display of a viewer device, such as on a transparent surface of a viewer device, such that a wearer/user of the AR viewer device (which may include AR glasses or headsets) is still able to view their physical environment. The AR display may include virtual images, text, models, sounds, animations, videos, instructions, multimedia and/or other digitally-generated content.

As used herein, the term "service provider" may refer to a party and/or entity (e.g., a business and/or other organizational entity) that provides services for a customer, e.g., by going to a customer's premises. This may include determining the optimal placement locations of one or more waters sensors and/or installing water sensors, security systems, etc., which may use the water sensors. Further, a service provider may be any individual, group of individuals, company, corporation, and/or other type of entity that may perform service for customers, including but not limited to an insurance company, a security system company, among others, such as insuring a property and/or monitoring a property.

As used herein, the term "property owner" indicates any individual associated with the property, such as a person who owns the property, a family member of the person who owns the property, a person renting/subletting the property, a person living or working on the property, or any other individual that may have an interest in fixing damage to the property.

Further, any reference to "structure" is meant to be exemplary and not limiting. The systems and methods described herein may be applied to any structure and/or property, such as homes, businesses, offices, farms, lots, parks, garages, and/or other types of properties and/or buildings. Accordingly, "homeowner" may be used interchangeably with "property owner." As used herein, "property" may also refer to any land, foundation, buildings, belongings and/or equipment disposed upon the property itself.

Exemplary Computer Environment

FIG. 1 depicts an exemplary environment 100 associated with optimizing placement of one or more water sensors 160 configured to detect a leak proximate a structure, such as a home 102. Although FIG. 1 depicts certain entities, components, equipment, and devices, it should be appreciated that additional or alternate entities, components, equipment, and devices are envisioned.

As illustrated in FIG. 1, the environment 100 may include in one aspect, one or more servers 105 which may perform the functionalities, such as optimizing the placement locations of a water sensor 160. The server 105 may be part of a cloud network or may otherwise communicate with other hardware or software components within one or more cloud computing environments to send, retrieve, or otherwise analyze data or information described herein. For example, in certain aspects of the present techniques, the computing environment 100 may comprise an on-premise computing environment, a multi-cloud computing environment, a public cloud computing environment, a private cloud computing environment, and/or a hybrid cloud computing environment. For example, an entity (e.g., a business) may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by the business. The public cloud may be partitioned using visualization and multi-tenancy techniques and may include one or more infrastructure-as-a-service (IaaS) and/or platform-as-a-service (PaaS) services.

A network 110 may comprise any suitable network or networks, including a local area network (LAN), wide area network (WAN), Internet, or combination thereof. For example, the network 110 may include a wireless cellular service (e.g., 4G, 5G, etc.). Generally, the network 110 enables bidirectional communication between the servers 105, a user device 115 and one or more water sensors 160. In one aspect, the network 110 may comprise a cellular base station, such as cell tower(s), communicating to the one or more components of the computing environment 100 via wired/wireless communications based upon any one or more of various mobile phone standards, including NMT, GSM, CDMA, UMTS, LTE, 5G, or the like. Additionally or alternatively, the network 110 may comprise one or more routers, wireless switches, or other such wireless connection points communicating to the components of the computing environment 100 via wireless communications based upon any one or more of various wireless standards, including by non-limiting example, IEEE 802.11a/b/c/g (Wi-Fi), Bluetooth, and/or the like. The server 105 may include one or more network interface controllers (NICs) 124. The NIC 124 may include any suitable network interface controller(s), and may communicate over the network 110 via any suitable wired and/or wireless connection. The NIC 124 may include one or more transceivers (e.g., WWAN, WLAN, and/or WPAN transceivers) functioning in accordance with IEEE standards, 3GPP standards, or other standards, and that may be used in receipt and transmission of data via external/network ports connected to the network 110.

The server 105 may include one or more processors 120. The processors 120 may include one or more suitable processors (e.g., central processing units (CPUs) and/or graphics processing units (GPUs)). The processors 120 may be connected to a memory 122 via a computer bus (not depicted) responsible for transmitting electronic data, data packets, or otherwise electronic signals to and from the processors 120 and memory 122 in order to implement or perform the machine-readable instructions, methods, processes, elements, or limitations, as illustrated, depicted, or described for the various flowcharts, illustrations, diagrams, figures, and/or other disclosure herein. The processors 120 may interface with the memory 122 via a computer bus to execute an operating system (OS) and/or computing instructions contained therein, and/or to access other services/aspects. For example, the processors 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 130, implemented as respective sets of computer-executable instructions (e.g., one or more source code libraries, trained ML models such as neural networks, convolutional neural networks, etc.) as described herein.

In general, a computer program or computer based product, application, or code (e.g., the model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data that is used to train and/or operate one or more ML models, provide AR models/displays, among other things.

In one aspect, the computing modules 130 may include an ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of ML, such as supervised learning, unsupervised learning, and reinforcement learning.

In one aspect, the ML based algorithms may be included as a library or package executed on server(s) 105. For example, libraries may include the TensorFlow based library, the PyTorch library, and/or the scikit-learn Python library.

In one embodiment, the ML module 140 employs supervised learning, which involves identifying patterns in existing data to make predictions about subsequently received data. Specifically, the ML module is "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon example inputs with associated outputs.

Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprising a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with de novo input that the model has not previously been provided, the model may output one or more predictions, classifications, etc., as described herein.

In operation, ML model training module 142 may access database 126 or any other data source for training data suitable to generate one or more ML models. The training data may be sample data with assigned relevant and comprehensive labels (classes or tags) used to fit the parameters (weights) of an ML model with the goal of training it by example. In one aspect, once an appropriate ML model is trained and validated to provide accurate predictions and/or responses, the trained model may be loaded into MLOM 144 at runtime to process input data and generate output data.

While various embodiments, examples, and/or aspects disclosed herein may include training and generating one or more ML models for the server 105 to load at runtime, it is also contemplated that one or more appropriately trained ML models may already exist (e.g., in database 126) such that the server 105 may load an existing trained ML model at runtime. It is further contemplated that the server 105 may retrain, update and/or otherwise alter an existing ML model and before loading the model at runtime.

In one aspect, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as the computer network 110 and/or the user device 115 (for rendering or visualizing) described herein. In one aspect, the servers 105 may include a client-server platform technology such as ASP.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen. The I/O module 146 may facilitate I/O components (e.g., ports, capacitive or resistive touch sensitive input panels, keys, buttons, lights, LEDs), which may be directly accessible via, or attached to, servers 105 or may be indirectly accessible via or attached to the user device 115. According to one aspect, an administrator or operator may access the servers 105 via the user device 115 to review information, make changes, input training data, initiate training via the MLTM 142, and/or perform other functions (e.g., operation of one or more trained models via the MLOM 144).

In one aspect, the computing modules 130 may include one or more NLP modules 148 comprising a set of computer-executable instructions implementing NLP, natural language understanding (NLU) and/or natural language generator (NLG) functionality. The NLP module 148 may be responsible for transforming the user input (e.g., unstructured conversational input such as speech or text) to an interpretable format. The NLP module 148 may include NLU processing to understand the intended meaning of utterances, among other things. The NLP module 148 may include NLG which may provide text summarization, machine translation, and/or dialog where structured data is transformed into natural conversational language (i.e., unstructured) for output to the user.

In one aspect, the computing modules 130 may include one or more chatbots and/or voice bots 150 which may be programmed to simulate human conversation, interact with users, understand their needs, and recommend an appropriate line of action with minimal and/or no human intervention, among other things. This may include providing the best response of any query that it receives and/or asking follow-up questions.

In some embodiments, the voice bots or chatbots 150 discussed herein may be configured to utilize AI and/or ML techniques, such as ML chatbot 152. For instance, the ML chatbot 152 may be a ChatGPT chatbot. The voice bot or chatbot 150 may employ supervised or unsupervised ML techniques, which may be followed by, and/or used in conjunction with, reinforced or reinforcement learning techniques. The voice bot or chatbot 150 may employ the techniques utilized for ChatGPT. The machine learning chatbot may be configured to generate verbal, audible, visual, graphic, text, or textual output for either human or other bot/machine consumption or dialogue.

Noted above, in some embodiments, a chatbot 150 or other computing device may be configured to implement ML, such that server 105 "learns" to analyze, organize, and/or process data without being explicitly programmed. ML may be implemented through ML methods and algorithms ("ML methods and algorithms"). In one exemplary embodiment, the ML module 140 may be configured to implement ML methods and algorithms.

As illustrated in FIG. 1, the environment 100 may include one or more water sensors 160. In one embodiment, the water sensors 160 may be placed proximate a structure such as home 102 to detect water and/or a leak. The water sensors 160 may be disposed on, inside, underneath, or proximate to the structure, property, foundation, appliance, equipment, pipe, plumbing and/or fixture which may provide information related to the detection of water. Some examples of "sensors" are, without limitation, moisture sensors, electrical sensors (e.g., voltage, current, capacitance and/or resistance sensors), optical sensors (e.g., a camera), ultrasonic sensors, acoustic sensors, pressure sensors (e.g., hydrostatic pressure), transducers, microelectromechanical sensors (MEMS), chemical sensors, odor/smell sensors, thermal sensors, infrared sensors (IR), bubblers, floats, and/or any other sensor capable of sensing an environment as is known in the art, especially those which may directly or indirectly sense moisture and/or water. In one example, the water sensors 160 include a water leak detection cable configured to detect a presence of water at any point along its length.

The one or more water sensors 160 may be hard-wired, wirelessly, and/or otherwise connected or interconnected in any suitable manner with one another and/or with one or more servers 105, user devices 115, each or any of which may be equipped with processor(s), memory unit(s), software application(s), wireless transceiver(s), a local power supply, and/or various other components.

The one or more water sensors 160 may sense, operate, or otherwise receive input and/or data in any suitable manner. This may include operating in a continuous and/or intermittent (e.g., every 5 millisecond) fashion. This may also include collecting, storing and/or transmitting data, e.g., via network 110. The data may be stored permanently or non-permanently in any suitable manner, such as on a local storage means, (e.g., RAM or a hard drive), or remotely on the server 105, in the cloud and/or another remote storage means. The one or more water sensors 160 may collect, store and/or transmit data individually or collectively.

The one or more water sensors 160 may communicate with one another in a wired, wireless or any other suitable manner. The communication may be continuous, intermittent, unidirectional, bidirectional or any other suitable means of communication. The one or more water sensors 160 may act in concert, e.g., in creating a mesh network. The one or more water sensors 160 may communicate or otherwise interface with one or more local or remote servers 105, user devices 115, processors, transceivers, each other, and/or other sensors for various purposes which may be unrelated to determining the presence of water, such as for timing, scheduling, updates, error correction, troubleshooting, status reporting, or any other suitable purpose.

The water sensors 160 may gather data regarding the environment in which they may be placed. The water sensor data may indicate the presence of water, and/or may include other information, such as a sensor identifier, timestamp, or any other suitable data. The water sensor data may indicate characteristics of the environment proximate the water sensor 160, such as electrical characteristics (e.g., conductivity), audio, image/video, and/or other suitable data. For example, the water sensor data may indicate the presence of water under an appliance where the water sensor 160 is placed.

The one or more servers 105 and/or water sensors 160 may also be in communication with one or more user devices 115, e.g., a user device associated with an owner of the home 102 and/or a service provider. The user device 115 may comprises one or more computers, which may comprise multiple, redundant, or replicated client computers accessed by one or more users. The user device 115 may access services or other components of the computing environment 100 via the network 110. The user device 115 may be any suitable device and include one or more mobile devices, wearables, smart watches, smart contact lenses, smart glasses, AR glasses/headsets, virtual reality (VR) glasses/headsets, mixed or extended reality glasses/headsets, voice bots or chatbots, ChatGPT bots, displays, display screens, visuals, and/or other electronic or electrical component. The user device 115 may include a memory and a processor for, respectively, storing and executing one or more modules. The memory may include one or more suitable storage media such as a magnetic storage device, a solid-state drive, random access memory (RAM), etc. The user device 115 may access services or other components of the computing environment 100 via the network 110, as further described herein.

In some embodiments, when the one or more water sensors 160 determine the presence of water, the one or more sensors 160 may notify a property owner (e.g., via network 110 and/or server 105) that a leak is likely present on the property. The property owner notification may include an indication of the location of the water, a graphic depiction of the water, likely cause of the water, and/or any other information gathered, determined or which may otherwise be helpful or informative for the property owner.

In one embodiment, the computing environment may provide an indication of one or more optimal placement locations of water sensors 160 proximate a structure, such as the home 102. In one aspect, this may include the server 105 obtaining structure information associated with the home 102. The structure information may be provided and/or obtained via a service provider (e.g., one having an association with the homeowner and/or structure, such as a city planning entity and/or an insurance entity) and/or homeowner via a user device 115. The structure information may be available publicly through records such as deeds, blueprints, real estate listings, etc. Using a trained ML model (e.g., trained via ML module 140), the server 105 may generate an indication of optimal placement locations proximate the structure for one or more water sensors 160 based upon the structure information. The server 105 may provide the placement location information to the user device 115 (e.g., of the homeowner and/or a service provider).

In one aspect, the ML chatbot 152 may generate requests for structure information and provide the requests to a user via a user device 115. The ML chatbot 152 may receive and/or provide the structure information to the trained ML model to generate the indication of the optimal placement location of the one or more water sensors 160 proximate the structure. The ML chatbot 152 may detect the output of the optimal placement locations of water sensors 160 by the trained ML model and provide them to the user device 115. This may include generating a multimedia representation of the optimal placement location of the one or more water sensors 160 proximate the structure to provide to the user device 115.

In embodiments where the user device 115 is an AR viewer device, the user device 115 may visualize the optimal placement locations of one or more water sensors 160 proximate a structure. The AR viewer device 115 may correlate overlay layer data with the underlay layer data to create an AR display including instructions for placement locations of the one or more water sensors 160, as further described herein.

Although the computing environment 100 is shown to include two user devices 115, one server 105, and one network 110, and four water sensors 160, it should be understood that different numbers of user devices 115, networks 110, servers 105, and/or water sensors 160 may be utilized. In one example, the computing environment 100 may include a plurality of servers 105 and hundreds or thousands of user devices 115 and/or water sensors 160, all of which may be interconnected via the network 110.

The computing environment 100 may include additional, fewer, and/or alternate components, and may be configured to perform additional, fewer, or alternate actions, including components/actions described herein. Although the computing environment 100 is shown in FIG. 1 as including one instance of various components such as user device 115, server 105, network 110, water sensors 160, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and thus database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 105 and user device 115 may be connected via a direct communication link (not shown in FIG. 1) instead of, or in addition to, via network 110.

Exemplary Mobile Device

Figure 2:
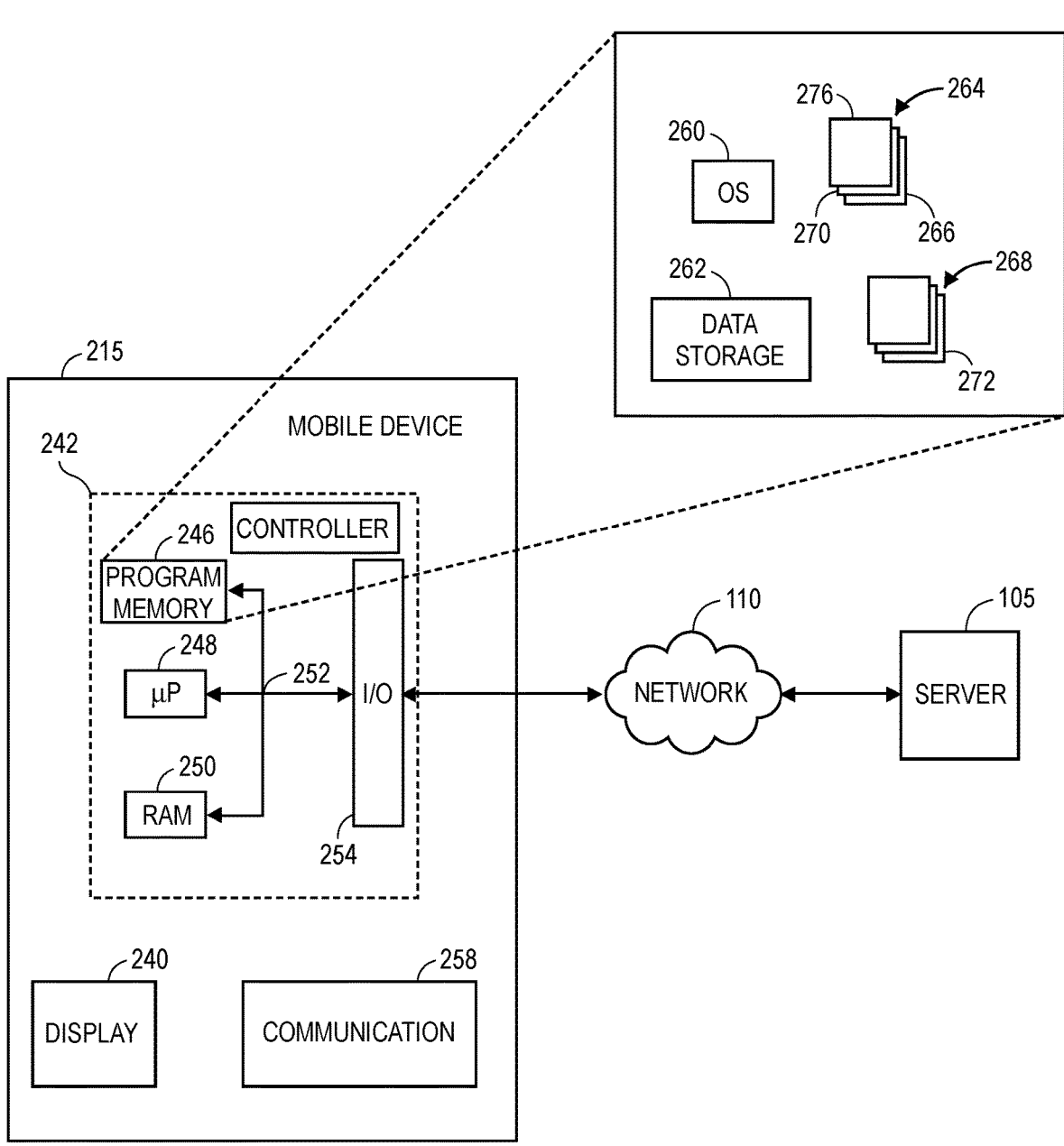
FIG. 2 depicts a block diagram of an exemplary mobile device in which computer-implemented methods and systems for determining optimal placement locations of water sensors are implemented, according to one embodiment.

Referring now to FIG. 2, in one embodiment the user device 115 may include a mobile device 215. The mobile device 215 may include a display 240, a communication unit 258, a user-input device (not shown), and a controller 242. The controller 242 may include a program memory 246, a microcontroller/processor/microprocessor (μP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage 262 may include data such as user profiles, application data for the plurality of applications 264, routine data for the plurality of routines 268, and/or other data necessary to interact with the one or more servers 105 through the network 110. In some embodiments, the controller 242 may also include, or otherwise be communicatively connected to, other data storage mechanisms (e.g., one or more hard disk drives, optical storage drives, solid state storage devices, etc.) that reside within the mobile device 215.

The communication unit 258 may communicate with the one or more servers 105 via any suitable wireless communication protocol network, such as a wireless telephony network (e.g., GSM, CDMA, LTE, 5G, 6G, UWB etc.), a Wi-Fi network (802.11 standards), a WiMAX network, a Bluetooth network, etc. The user-input device (not shown) may include a "soft" keyboard that is displayed on the display 240 of the mobile device 215, an external hardware keyboard communicating via a wired and/or a wireless connection (e.g., a Bluetooth keyboard), an external mouse, a touchscreen, a stylus, and/or any other suitable user-input device.

As discussed with reference to the one or more servers 105, it should be appreciated that although FIG. 2 depicts only one microprocessor 248, the controller 242 may include multiple microprocessors 248. Similarly, the memory of the controller 242 may include multiple RAMs 250 and/or multiple program memories 246. Although FIG. 2 depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and/or configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the mobile device 215.

One of the plurality of applications 264 may be a native application and/or web browser 270, such as Apple's Safari®, Google Chrome™ mobile web browser, Microsoft Internet Explorer® for Mobile, Opera Mobile™, that may be implemented as a series of machine-readable instructions for receiving, interpreting, and/or displaying application screens or web page information from the one or more servers 105 while also receiving inputs from the user. Another application of the plurality of applications may include an embedded web browser 276 that may be implemented as a series of machine-readable instructions for receiving, interpreting, and/or displaying web page information.

In one aspect, a user may launch a client application 266 from a client device, such as one of the user devices 115, to communicate with the one or more servers 105 to determine the optimal placement location of one or more water sensors 160 proximate a structure (such as the home 102). Additionally, the property owner and/or the user may also launch or instantiate any other suitable user interface application (e.g., the native application or web browser 270, and/or any other one of the plurality of software applications 264) to access the one or more servers 105 to realize aspects of the inventive system.

One of the plurality of routines may include a water sensor routine 272 that may display information about the water sensors installed in a structure and provide notification when any of the water sensors 160 detect the presence of water, which may indicate a leak. In some embodiments, the water sensor routine 272 may launch automatically upon receiving a notification from one or more water sensors 160 and/or servers 105 indicating a presence of water and/or a leak.

Generally, the term "user" is used when referring to a person who is operating one of the user devices 115 and is not exclusive of the term "property owner," "homeowner," and/or "service provider."

The mobile device 215 may include additional, fewer, and/or alternate components, and may be configured to perform additional, fewer, or alternate actions, including components/actions described herein. Although the mobile device 215 is shown in FIG. 2 as including one instance of various components such as display 240, processor 248, etc., various aspects include the mobile device 215 implementing any suitable number of any of the components shown in FIG. 2 and/or omitting any suitable ones of the components shown in FIG. 2. Moreover, various aspects include the mobile device 215 including any suitable additional component(s) not shown in FIG. 2, such as but not limited to the exemplary components described above. Furthermore, it should be appreciated that additional and/or alternative connections between components shown in FIG. 2 may be implemented.

Exemplary AR Device

Figure 3:
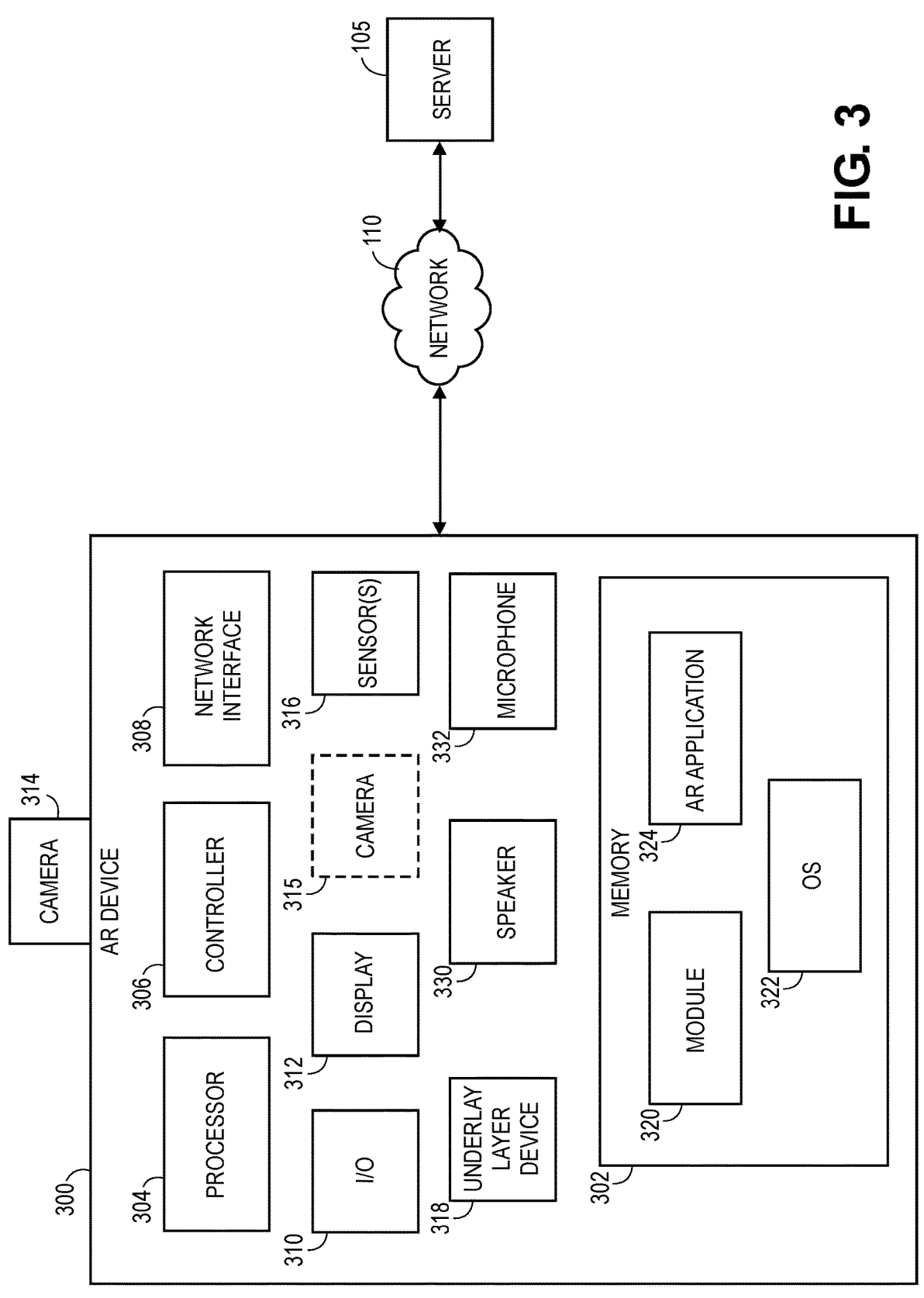
FIG. 3 depicts a block diagram of an exemplary AR device in which computer-implemented methods and systems for determining optimal placement locations of water sensors are implemented, according to one embodiment.

FIG. 3 depicts an exemplary AR viewer device 300 that may implement the techniques described herein, for visualizing water sensor placement. The AR viewer device 300 may be, for example, a smartphone, tablet device, laptop computer, electronic contact lenses, a projector, glasses, googles, a headset such as the Google Glass, an MR headset such as the Microsoft HoloLens, and/or other suitable computer device.

The AR viewer device 300 may include a memory 302, a processor (CPU) 304, a controller 306, a network interface 308, an I/O 310, a display 312, cameras 314, 315, sensors 316, an underlay layer device 318, a speaker 330 and/or a microphone 332.

The memory 302 may include one or more memories, such as a non-transitory, computer readable memory comprising computer-executable instructions that, when executed, cause the AR viewer device 300 to perform actions thereof described in this description (e.g., via the processor 304, controller 306, display 312 and/or other components of the AR viewer device 300). The memory 302 may comprise one or more memory modules 320 such a random-access memory (RAM), read-only memory (ROM), flash memory, a hard disk drive (HDD), a solid-state drive (SSD), flash memory, MicroSD cards, and/or other types of suitable memory.

The memory 302 may store an operating system (OS) 322 (e.g., Microsoft Windows Mixed Reality Platform, Linux, Android, iOS, UNIX, etc.) capable of facilitating the functionalities, applications, methods, or other software as discussed herein. Memory 302 may also store one or more applications to, e.g., for determining the optimal placement of one or more water sensors proximate a structure such as a home. In one embodiment, memory 302 may store an AR application 324 which may, among other things, present AR displays to the display 312 of AR viewer device 300 as described in more detail herein.

Additionally, or alternatively, the memory 302 may store data from various sources, e.g., AR displays, virtual models, overlay layer data, floorplans, structure information, property information, plumbing information, as well as any other suitable data.

The processor 304 may include one or more local or remote processors, which may be of general-purpose or specific-purpose. In some embodiments this may include one or more microprocessors, ASICs, FPGAs, systems-on-chip (SoCs), systems-in-package (SiPs), graphics processing units (GPUs), well as any other suitable types of processors. During operation, the processor 304 may execute instructions stored in the program memory module 302 coupled to the processor 304 via a system bus of a controller 306.

The AR viewer device 300 may further include the controller 306. The controller 306 may receive, process, generate, transmit, and/or store data and may include and/or be operably connected to (e.g., via the system bus) the memory 302, the processor 304, and/or the I/O 310, as well as any other suitable components.

The AR viewer device 300 may further include a network interface 308, which may facilitate communications to and/or from the AR viewer device 300 with one or more devices and/or networks, such as the server 105 via network 110. The network interface 308 may include one or more transceivers and/or modems, and may facilitate any suitable wired or wireless communication, standard or technology, such as GSM, CDMA, TDMA, WCDMA, LTE, EDGE, OFDM, GPRS, EV-DO, UWB, 3G, 4G, 5G, IEEE 802 including Ethernet, WiMAX, Wi-Fi, Bluetooth, and/or other suitable communication.

The I/O 310 (i.e., one or more input and/or output units) may include, interface with and/or be operably connected to, for example, one or more input devices such as a touchpad, a touchscreen, a keyboard, a mouse, a camera 314, 315, underlay layer device 318, and/or microphone 332, as well as one or more output devices such as a display 312, a speaker 330, a haptic/vibration device, and/or other suitable input and/or output devices. In some embodiments, the I/O 310 may include one or more peripheral I/O devices, such as a peripheral display, microphone 332, camera 314, 315, sensors 316 and/or other interface devices operably connected to the AR viewer device 300 (e.g., via a wired or wireless connection) via the I/O 310. Although FIG. 3 depicts the I/O 310 as a single block, the I/O 310 may include a number of different I/O circuits, busses and/or modules, which may be configured for I/O operations.

One or more cameras 314, 315 may capture still and/or video images of the physical environment of the AR viewer device 300. The cameras 314, 315 may include digital cameras, such as charge-coupled devices, to detect electromagnetic radiation in the visual range or other wavelengths. In some embodiments, as depicted in FIG. 3, one or more interior cameras 315 may be located on the interior of the AR viewer device 300, e.g., for tracking the eyes of the user via OS 322 and/or AR application 324. The AR viewer device 300 may include one or more exterior cameras 314 located on the exterior of AR viewer device 300, e.g., for user hand tracking, object identification, and/or localization within the physical environment via OS 322 and/or AR application 324. In other embodiments, one or more of the cameras (not shown) may be external to, and operably connected with (e.g., via I/O 310, Bluetooth and/or Wi-Fi) the AR viewer device 300. The captured images may be used to generate AR displays, augmented environments, and the like. In some embodiments, two or more cameras, such as external cameras 314, may be disposed to obtain stereoscopic images of the physical environment, thereby better enabling the AR viewer device 300 to generate virtual space representations of the physical environment, and/or overlay augmented information onto the physical environment.

The display 312, along with other integrated or operably connected devices, may present augmented and/or virtual information to a user of the AR viewer device 300, such as an AR display. The display 312 may include any known or hereafter developed visual or tactile display technology, including LCD, LED, OLED, AMOLED, a projection display, a haptic display, a holographic display, or other types of displays. In some embodiments, the display 312 may include dual and/or stereoscopic displays, e.g., one for presenting content to the left eye and another for presenting content to the right eye. In some embodiments, the display 312 may be transparent allowing the user to see the physical environment around them, e.g., for implementing AR techniques in which an AR display may be overlaid on the physical environment.

According to one embodiment of FIG. 3, the AR viewer device 300 may present one or more AR displays via the display 312. For example, the display 312 may be a surface positioned in a line of sight of the wearer of the AR viewer device 300. Accordingly, the AR viewer device 300 may be configured to overlay augmented information included in the AR display onto features of the physical environment within the line of sight of the wearer of the AR viewer device 300. To determine the line of sight of the wearer, the AR viewer device 300 may include an image sensor (such as an external camera 314 and/or underlay layer device 318) configured to have a field of view that generally aligns with the line of the sight of the wearer. In one embodiment, the AR viewer device 300 may be configured to route the image data to the server 105 to generate an AR display that includes information related to objects within the line of sight of the wearer. For example, the server 105 may include one or more object classification models configured to identify one or more objects within the received image data and provide the classification data back to the AR viewer device to present an AR display that includes at least a portion of the classification data.

The AR viewer device 300 may further include one or more sensors 316. In some embodiments, additional local and/or remote sensors 316 may be communicatively connected to the AR viewer device 300. The sensors 316 may include any devices or components mentioned herein, other devices suitable for capturing data regarding the physical environment, and/or later-developed devices that may be configured to provide data regarding the physical environment (including components of structures or objects within the physical environment).

Exemplary sensors 316 of the AR viewer device 300 may include one or more accelerometers, gyroscopes, inertial measurement units (IMUs), GPS units, proximity sensors, cameras 314, 315 microphones 332, as well as any other suitable sensors. Additionally, other types of currently available or later-developed sensors may be included in some embodiments. One or more sensors 316 of the AR viewer device 300 may be configured for localization, eye/hand/head/movement tracking, geolocation, object recognition, computer vision, photography, positioning and/or spatial orientation of the device, as well as other suitable purposes. The sensors 316 may provide sensor data regarding the local physical environment which may be used to generate a corresponding AR display, as described herein, among other things.

AR viewer device 300 may further include underlay layer device 318 configured to generate underlay layer data from the field of view of the wearer. As will be described elsewhere herein, the underlay layer data may be analyzed to create the AR display. In one illustrative example, the underlay layer device 318 may be camera, such as camera 314, coupled to the AR viewer device 300 in a manner such that the camera has a field of view that generally aligns with the field of view of a user of the AR viewer device 300. As used herein, the word "camera" should be understood to include a camera that records one or both of images and/or video data. In certain embodiments where the AR viewer device 300 is a phone or a tablet, the underlay layer data device 318 may be built into the AR viewer device 300. In some embodiments where the AR viewer device 300 is worn by the user, the underlay layer data device 318 may be fixedly attached to the AR viewer device 300.

In one embodiment, the AR viewer device 300 or other device may process data from one or more sensors 316 to generate a semi-virtual environment. For example, data from one or more sensors 316, such as cameras 314, 315, underlay layer device 318, accelerometers, gyroscopes, IMUs, etc., may be processed, e.g., at the server 105 and/or at the AR viewer device 300, which may include AR application 324, to determine aspects of the physical environment which may include object recognition, the orientation and/or localization of the AR viewer device 300, the field of view of the user, among other things. In one embodiment, the sensor data may be combined with image data generated by the cameras 314, 315 and/or underlay layer device 318 to present AR displays via the display 312 of the AR viewer device 300 using the AR application 324, which may include displaying and/or overlaying images, models, instructions, animations, video, multimedia and/or other digitally-generated content onto the physical environment via the display 312.

The AR viewer device 300 may include one or more speakers 330 configured to emit sounds and one or more microphones 332 configured to detect sounds. The one or more speakers 330 and/or microphones 332 may be disposed on the AR viewer device 300 and/or remotely from, and operably connected to, the AR viewer device 300, e.g., via a wire and/or wirelessly. In one embodiment, the speaker 330 and/or microphone 332 may be configured to provide multimedia effects in conjunction with an AR display, receive voice commands e.g., to control the AR viewer device 300, among other things.

In one embodiment, AR viewer device 300 may receive and/or access overlay layer data (e.g., data stored in a database, such as database 126) to create the AR display. For example, the database 126 on server 105 may be configured to store structure information associated with a structure. The structure information may include a floorplan of a structure, and/or information describing the structure, property, appliances, items and/or objects associated with the structure, among other things. The overlay layer data may be correlated (e.g., on the server 105) with the underlay layer data (e.g., from the underlay layer device 318) to create the AR display. For example, a user of the AR viewer device 300 may have access to structure information for their present location, including a floorplan. The AR viewer device 300 and/or server 105 may process the underlay layer data generated via underlay layer data device 318, data from sensors 316 such as locations via a GPS sensor, orientation data from an orientation sensor and/or overlay layer data of the floorplan. The AR viewer device 300 and/or server 105 may correlate the overlay layer data, underlay layer data and/or sensor data to generate an AR display, identify the location of the AR viewer device 300, and/or any other suitable purpose. The AR display may identify the room of the structure the user is in, objects in the field of view of the user (e.g., appliances), guidance information to travel to another locations, information regarding potential sources of a leak proximate the user, installation locations of water sensors, or other suitable information.

In some embodiments, the AR viewer device 300 may be a personal electronic device, such as a smartphone or tablet. For example, the personal electronic device may be configured to execute the AR application 324 in which a rear-facing camera captures image data of the physical environment proximate to the AR viewer device 300 and overlays AR data onto the display 312. Accordingly, in these embodiments, the functionality of the AR viewer device 300 and/or the personal electronic device may be integrated at a single device.

In other embodiments, the AR viewer device 300 may include a base unit coupled to an AR viewer. For example, the base unit may be integrally formed with the AR viewer, such as in a frame that supports the display 312.

In other embodiments, the base unit and the AR viewer are physically separate and in wireless communication (e.g., via Bluetooth, Wi-Fi, or other short-range communication protocol) or wired communication with one another. In these embodiments, both the base unit and the AR viewer may include local versions of the components described with respect to the AR viewer device 300. For example, both base unit and the AR viewer may include respective memories 302, processors 304, controllers 306, network interfaces 308, and/or sensors 316. Accordingly, the respective memories 302 may include respective versions of the AR application 324 that coordinate the execution of the functionality described herein between the AR viewer and the base unit.

Generally, the AR application 324 may utilize the components of the base unit to perform the more processor-intensive functionality described with respect to the AR viewer device 300. For example, the base unit may be configured to process sensor data, wirelessly communicate with the server 105, create AR displays, etc. On the other hand, the AR application 324 may utilize the components of the viewer device to transmit sensor data to present AR displays via the display 312.

The AR viewer device 300 may include a power source (not shown), such as a rechargeable battery pack. The power source may be integral to the AR viewer device 300 and/or may be a separate power source within the base unit and operably connected to the AR viewer device 300.

The AR viewer device 300 may include additional, fewer, and/or alternate components, and may be configured to perform additional, fewer, or alternate actions, including components/actions described herein. Although the AR viewer device 300 is shown in FIG. 3 as including one instance of various components such as processor 304, underlay layer device 318 etc., various aspects include the AR viewer device 300 implementing any suitable number of any of the components shown in FIG. 3 and/or omitting any suitable ones of the components shown in FIG. 3. Moreover, various aspects include the AR viewer device 300 including any suitable additional component(s) not shown in FIG. 3, such as but not limited to the exemplary components described above. Furthermore, it should be appreciated that additional and/or alternative connections between components shown in FIG. 3 may be implemented.

Exemplary Training of the ML Chatbot Model

Programmable chatbots, such the chatbot 150 and/or the ML chatbot 152 (e.g., ChatGPT), may provide tailored, conversational-like abilities relevant to optimizing the placement of one or more water sensors proximate a structure. The chatbot may be capable of understanding user requests/responses, providing relevant information, etc. Additionally, the chatbot may generate data from user interactions which the enterprise may use to personalize future support and/or improve the chatbot's functionality, e.g., when retraining and/or fine-tuning the chatbot.

The ML chatbot may provide advance features as compared to a non-ML chatbot, which may include and/or derive functionality from a large language model (LLM). The ML chatbot may be trained on a server, such as server 105, using large training datasets of text which may provide sophisticated capability for natural-language tasks, such as answering questions and/or holding conversations. The ML chatbot may include a general-purpose pretrained LLM which, when provided with a starting set of words (prompt) as an input, may attempt to provide an output (response) of the most likely set of words that follow from the input. In one aspect, the prompt may be provided to, and/or the response received from, the ML chatbot and/or any other ML model, via a user interface of the server. This may include a user interface device operably connected to the server via an I/O module, such as the I/O module 146. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances and/or prompts, which may require the ML chatbot to keep track of an entire conversation history as well as the current state of the conversation. The ML chatbot may rely on various techniques to engage in conversations with users, which may include the use of short-term and long-term memory. Short-term memory may temporarily store information (e.g., in the memory 122 of the server 105) that may be required for immediate use and may keep track of the current state of the conversation and/or to understand the user's latest input in order to generate an appropriate response. Long-term memory may include persistent storage of information (e.g., on database 126 of the server 105) which may be accessed over an extended period of time. The long-term memory may be used by the ML chatbot to store information about the user (e.g., preferences, chat history, etc.) and may be useful for improving an overall user experience by enabling the ML chatbot to personalize and/or provide more informed responses.

The system and methods to generate and/or train an ML chatbot model (e.g., via the ML module 140 of the server 105) which may be used by the ML chatbot, may consist of three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 4:
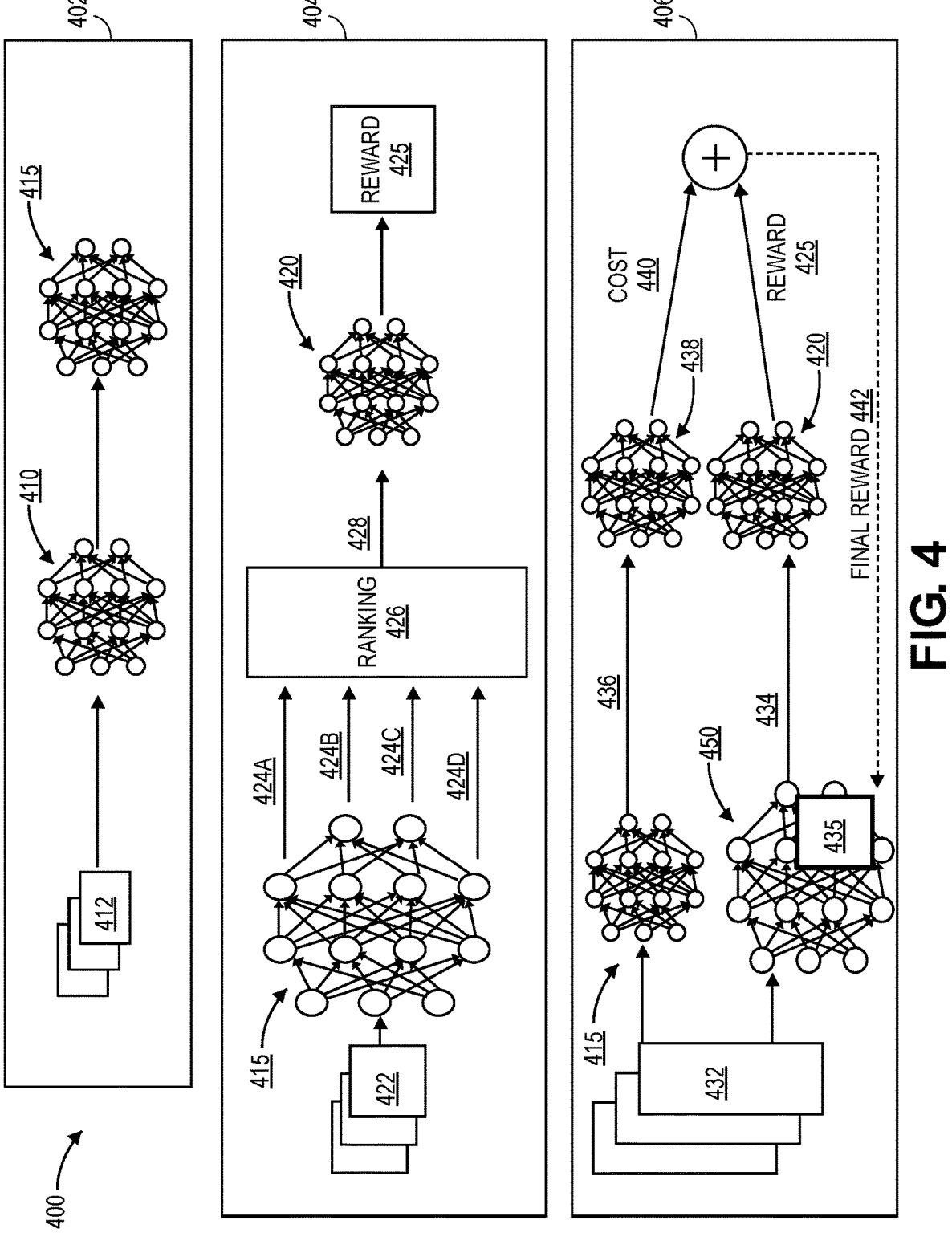
FIG. 4 depicts a combined block and logic diagram in which exemplary computer-implemented methods and systems for training an ML chatbot model are implemented, according to one embodiment.

FIG. 4 depicts a combined block and logic diagram 400 for training an ML chatbot model, in which the techniques described herein may be implemented, according to some embodiments. Some of the blocks in FIG. 4 may represent hardware and/or software components, other blocks may represent data structures or memory storing these data structures, registers, or state variables (e.g., data structures for training data 412), and other blocks may represent output data (e.g., 425). Input and/or output signals may be represented by arrows labeled with corresponding signal names and/or other identifiers. The methods and systems may include one or more servers 402, 404, 406, such as the server 105 of FIG. 1.

In one aspect, the server 402 may fine-tune a pretrained language model 410. The pretrained language model 410 may be obtained by the server 402 and be stored in a memory, such as memory 122 and/or database 126. The pretrained language model 410 may be loaded into an ML training module, such as MLTL 142, by the server 402 for retraining/fine-tuning. A supervised training dataset 412 may be used to fine-tune the pretrained language model 410 wherein each data input prompt to the pretrained language model 410 may have a known output response for the pretrained language model 410 to learn from. The supervised training dataset 412 may be stored in a memory of the server 402, e.g., the memory 122 or the database 126. In one aspect, the data labelers may create the supervised training dataset 412 prompts and appropriate responses. The pretrained language model 410 may be fine-tuned using the supervised training dataset 412 resulting in the SFT ML model 415 which may provide appropriate responses to user prompts once trained. The trained SFT ML model 415 may be stored in a memory of the server 402, e.g., memory 122 and/or database 126.

In one aspect, the supervised training dataset 412 may include prompts and responses which may be relevant to determining optimal placement location of water sensors proximate a structure. For example, a user prompt may include a request of where to place one or more water sensors around a home. Appropriate responses from the trained SFT ML model 415 may include requesting from the user information regarding the floorplan, structural components, the property the structure is located upon, plumbing at the structure, appliances at the structure, or other information associated with indicating the optimal placement of the one or more water sensors. The responses from the trained SFT ML model 415 may include an indication of one or more optimal placement locations of the one or more water sensors. The indication may be via text, audio, multimedia, etc.

Training the Reward Model

In one aspect, training the ML chatbot model 450 may include the server 404 training a reward model 420 to provide as an output a scaler value/reward 425. The reward model 420 may be required to leverage reinforcement learning with human feedback (RLHF) in which a model (e.g., ML chatbot model 450) learns to produce outputs which maximize its reward 425, and in doing so may provide responses which are better aligned to user prompts.

Training the reward model 420 may include the server 404 providing a single prompt 422 to the SFT ML model 415 as an input. The input prompt 422 may be provided via an input device (e.g., a keyboard) via the I/O module of the server, such as I/O module 146. The prompt 422 may be previously unknown to the SFT ML model 415, e.g., the labelers may generate new prompt data, the prompt 422 may include testing data stored on database 126, and/or any other suitable prompt data. The SFT ML model 415 may generate multiple, different output responses 424A, 424B, 424C, 424D to the single prompt 422. The server 404 may output the responses 424A, 424B, 424C, 424D via an I/O module (e.g., I/O module 146) to a user interface device, such as a display (e.g., as text responses), a speaker (e.g., as audio/ voice responses), and/or any other suitable manner of output of the responses 424A, 424B, 424C, 424D for review by the data labelers.

The data labelers may provide feedback via the server 404 on the responses 424A, 424B, 424C, 424D when ranking 426 them from best to worst based upon the prompt-response pairs. The data labelers may rank 426 the responses 424A, 424B, 424C, 424D by labeling the associated data. The ranked prompt-response pairs 228 may be used to train the reward model 420. In one aspect, the server 404 may load the reward model 420 via the ML module (e.g., the ML module 140) and train the reward model 420 using the ranked response pairs 228 as input. The reward model 420 may provide as an output the scalar reward 425.

In one aspect, the scalar reward 425 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 420 may generate a winning reward. Inputting a "losing" prompt-response pair data to the same reward model 420 may generate a losing reward. The reward model 420 and/or scalar reward 436 may be updated based upon labelers ranking 426 additional prompt-response pairs generated in response to additional prompts 422.

In one example, a data labeler may provide to the SFT ML model 415 as an input prompt 422, "Describe the sky." The input may be provided by the labeler via the user device 102 over network 110 to the server 404 running a chatbot application utilizing the SFT ML model 415. The SFT ML model 415 may provide as output responses to the labeler via the user device 102: (i) "the sky is above" 424A; (ii) "the sky includes the atmosphere and may be considered a place between the ground and outer space" 424B; and (iii) "the sky is heavenly" 424C. The data labeler may rank 426, via labeling the prompt-response pairs, prompt-response pair 422/424B as the most preferred answer; prompt-response pair 422/424A as a less preferred answer; and prompt-response 422/424C as the least preferred answer. The labeler may rank 426 the prompt-response pair data in any suitable manner. The ranked prompt-response pairs 228 may be provided to the reward model 420 to generate the scalar reward 425.

While the reward model 420 may provide the scalar reward 425 as an output, the reward model 420 may not generate a response (e.g., text). Rather, the scalar reward 425 may be used by a version of the SFT ML model 415 to generate more accurate responses to prompts, i.e., the SFT model 415 may generate the response such as text to the prompt, and the reward model 420 may receive the response to generate a scalar reward 425 of how well humans perceive it. Reinforcement learning may optimize the SFT model 415 with respect to the reward model 420 which may realize the configured ML chatbot model 450.

RLHF to Train the Ml Chatbot Model

In one aspect, the server 406 may train the ML chatbot model 450 (e.g., via the ML module 140) to generate a response 434 to a random, new and/or previously unknown user prompt 432. To generate the response 434, the ML chatbot model 450 may use a policy 235 (e.g., algorithm) which it learns during training of the reward model 420, and in doing so may advance from the SFT model 415 to the ML chatbot model 450. The policy 235 may represent a strategy that the ML chatbot model 450 learns to maximize its reward

425. As discussed herein, based upon prompt-response pairs, a human labeler may continuously provide feedback to assist in determining how well the ML chatbot's 450 responses match expected responses to determine rewards 425. The rewards 425 may feed back into the ML chatbot model 450 to evolve the policy 235. Thus, the policy 235 may adjust the parameters of the ML chatbot model 450 based upon the rewards 425 it receives for generating good responses. The policy 235 may update as the ML chatbot model 450 provides responses 434 to additional prompts 432.

In one aspect, the response 434 of the ML chatbot model 450 using the policy 235 based upon the reward 425 may be compared using a cost function 438 to the SFT ML model 415 (which may not use a policy) response 436 of the same prompt 432. The server 406 may compute a cost 440 based upon the cost function 438 of the responses 434, 436. The cost 440 may reduce the distance between the responses 434, 436, i.e., a statistical distance measuring how one probability distribution is different from a second, in one aspect the response 434 of the ML chatbot model 450 versus the response 436 of the SFT model 415. Using the cost 440 to reduce the distance between the responses 434, 436 may avoid a server over-optimizing the reward model 420 and deviating too drastically from the human-intended/preferred response. Without the cost 440, the ML chatbot model 450 optimizations may result in generating responses 434 which are unreasonable but may still result in the reward model 420 outputting a high reward 425.

In one aspect, the responses 434 of the ML chatbot model 450 using the current policy 235 may be passed by the server 406 to the rewards model 420, which may return the scalar reward or discount 425. The ML chatbot model 450 response 434 may be compared via cost function 438 to the SFT ML model 415 response 436 by the server 406 to compute the cost 440. The server 406 may generate a final reward 442 which may include the scalar reward 425 offset and/or restricted by the cost 440. The final reward or discount 442 may be provided by the server 406 to the ML chatbot model 450 and may update the policy 235, which in turn may improve the functionality of the ML chatbot model 450.

To optimize the ML chatbot 450 over time, RLHF via the human labeler feedback may continue ranking 426 responses of the ML chatbot model 450 versus outputs of earlier/other versions of the SFT ML model 415, i.e., providing positive or negative rewards or adjustments 425. The RLHF may allow the servers (e.g., servers 404, 406) to continue iteratively updating the reward model 420 and/or the policy 235. As a result, the ML chatbot model 450 may be retrained and/or fine-tuned based upon the human feedback via the RLHF process, and throughout continuing conversations may become increasingly efficient.

Although multiple servers 402, 404, 406 are depicted in the exemplary block and logic diagram 400, each providing one of the three steps of the overall ML chatbot model 450 training, fewer and/or additional servers may be utilized and/or may provide the one or more steps of the ML chatbot model 450 training. In one aspect, one server may provide the entire ML chatbot model 450 training.

Exemplary Ml Model to Determine Optimal Water Sensor Placement

In one embodiment, determining an optimal placement of one or more water sensors proximate a structure may use ML. The structure may include a home, business, and/or other structure which may be suitable for water sensors, e.g., to detect a leak.

Figure 5:
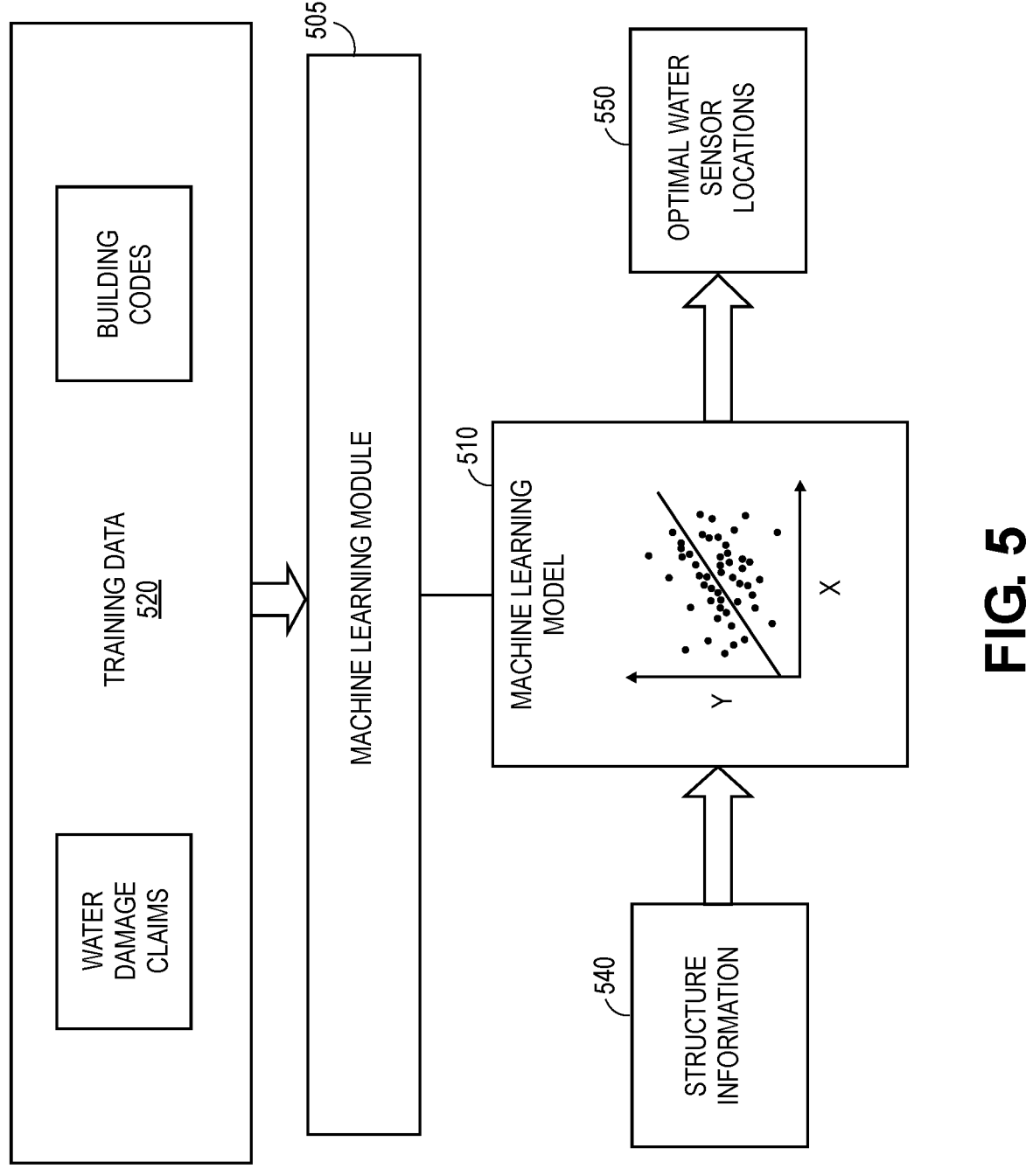
FIG. 5 depicts a combined block and logic diagram in which exemplary computer-implemented methods and systems for using ML to identify optimal water sensor placement locations are implemented, according to one embodiment.

FIG. 5 schematically illustrates how an ML model may generate optimal placement locations for one or more water sensors based upon structure information. Some of the blocks in FIG. 5 represent hardware and/or software components (e.g., block 505), other blocks represent data structures or memory storing these data structures, registers, or state variables (e.g., blocks 520), and other blocks represent output data (e.g., block 550). Input signals are represented by arrows labeled with corresponding signal names.

The ML engine 505 may include one or more hardware and/or software components, such as the MLTM 142 and/or the MLOM 144, to obtain, create, (re)train, operate and/or save one or more ML models 510. To generate the ML model 510, the ML engine 505 may use the training data 520.

As described herein, the server such as server 105 may obtain and/or have available various types of training data 520 (e.g., stored on database 126 of server 105). In an aspect, the training data 520 may labeled to aid in training, retraining and/or fine-tuning the ML model 510. The training data 520 may include data associated with historical water damage claims which may indicate one or more of a source of water damage, a cause of the water damage, a location of the water damage, and/or a type of structure where the water damage occurred. For example, the historical water damage insurance claims data may indicate that a two-story, 2600 sq. ft home with two bathrooms was serviced by a 15-year-old water heater which became the source of a water leak.

The training data 520 may include geographic locations of structures associated with the water damage claims and/or building code requirements for various geographic locations. An ML model may process this type of training data 520 to derive associations between building code requirements for geographic locations and potential sources of water damage. The building codes may include design requirements for structures affecting the location of potential sources of water damage, e.g., plumbing, toilets, sinks, faucets, pipes, valves, water lines, appliances, drains, water connections, etc. The building codes may determine locations, design requirements and/or other restrictions which may be useful to the ML model 510 when evaluating potential sources of water damage. For example, a municipal building code may require multi-unit structures with roof decks to have a drain system located at all four corners of the building which evacuates water to the street level. Based upon this data and potentially historical water damage claims data, the ML model 510 may make detect patterns in the training data for multi-unit structures subject to the municipal building code which indicate that corner unit condominiums may be prone to experiencing water damage from the drain system.

While the example training data includes indications of various types of training data 520, this is merely an example for ease of illustration only. The training data 520 may include any suitable data which may indicate associations between building code requirements for geographic locations, potential sources of water damage, indications of the optimal placement location of one or more water sensors proximate the structure, as well as any other suitable data which may train the ML model 510 to generate an indication of optimal placement locations of water sensors proximate a structure.

In an aspect, the server may continuously update the training data 520, e.g., based upon obtaining additional historical water damage claims data, or any other training data. Subsequently, the ML model 510 may be retrained/fine-tuned based upon the updated training data 520. Accordingly, the identification of one or more locations proximate the structure to place the water sensors 550 may improve over time.

In an aspect, the ML engine 505 may process and/or analyze the training data 520 (e.g., via MLTM 142) to train the ML model 510 to generate the optimal water sensor placement locations 550. The ML model 510 may be trained to determine the optimal sensor placement locations 550 via a regression model, k-nearest neighbor algorithm, support vector regression algorithm, and/or random forest algorithm, although any type of applicable ML model/algorithm may be used, including training using one or more of supervised learning, unsupervised learning, semi-supervised learning, and/or reinforcement learning.

Once trained, the ML model 510 may perform operations on one or more data inputs to produce a desired data output. In one aspect, the ML model 510 may be loaded at runtime (e.g., by MLOM 144) from a database (e.g., database 126 of server 105) to process the structure information 540 data input. The server, such as server 105, may obtain the structure information 540 and use it as an input to determine the optimal placement location of the one or more water sensors 550. In one aspect, the server may obtain the structure information 540 via user input on a user device, such as the mobile device 215 (e.g., of the property owner and/or a water sensor installation service provider) which may be running a mobile app and/or via a website, the chatbot 450, the AR viewer device 300, or any other suitable user device. The server may obtain the structure information 540 from available data associated with the structure such as government databases of land/property records; a business such as a real estate company which may have publicly listed the property for sale including structure information 540; an insurance company which may have insured the structure and gathered relevant structure information 540 in the process, as well as other suitable sources of structure information 540.

The structure information 540 may include the floorplan of the structure, such as the number of floors, square footage, the location, dimensions, number and/or type of rooms (such as a bathroom), etc. The structure information 540 may include structural components of the structure, such as the type of roof, drain systems, decks, foundation, as well as other suitable structure components. The structure information 540 may include the property the structure is located upon including the grading of the land, whether it includes a yard, grass, pavement, concrete, driveway and/or a water feature on the property, as well as other suitable information regarding the property. The structure information 540 may include the plumbing at the structure such as the number, location, age, condition and/or type of plumbing, pipes, toilets, sewage lines, drains, and/or water lines throughout the structure and/or property. In one aspect, the structure information 540 may include the appliance information, such as the number, type, location, age, and/or condition of the appliances at the structure. The appliances may include one or more of a dishwasher, washing machine, irrigation system, water heater, sump pump, or other appliances which may require a water, to name but a few. The structure information 540 may include any information which may be relevant to determining one or more locations proximate the structure to place a water sensor 550.

In one aspect, the ML model 510 may weight one or more attributes of the structure information 540 such that they are of unequal importance. For example, appliances which use water such as washing machines, dishwashers and water heaters may all be considered potential sources of water leaks, e.g., if the appliance malfunctions and water leaks as a result. However, the age of the appliance may be an aspect of the structure information 540 which may be weighted as compared to other features of the structure information input into the ML model 510. For example, structure information 540 may indicate a washing machine and dishwasher within the structure are brand new and therefore may be considered in excellent operating condition and less prone to malfunction which may cause a leak. However, the structure information 540 may indicate the water heater in the structure is an aging 20-year-old model which may indicate a higher likelihood of being a potential source of a water leak. Thus, the ML model 510 may apply an increased weight to the age of the appliance and rank, score or otherwise indicate the location near the water heater as a more optimal location to place a water sensor as compared to the washing machine and/or dishwasher.

In one embodiment, the ML model 510 may use a regression model to determine a score associated with the potential sources of water damage based upon the structure information 540 input, which may be a preferred model in situations involving scoring output data. In one aspect, the ML model 510 may rank locations of potential sources of water damage where a water sensor would ideally be placed. This may include scored ranking such that locations having certain scores may be considered as having the highest potential as a source of a leak and thus be optimal candidate locations for placement of a water sensor 550. For example, based upon the structure information 540, the ML model may indicate locations under a dishwasher and/or next to a water heater would be ideal locations for water sensors based upon associated scores, but sensors underneath a bathroom or kitchen sink do not have scores high enough to warrant being considered as optimal locations to place water sensors, as further described herein.

In one aspect, the ML model 510 may also determine the number of water sensors to place proximate the structure. For example, the ML model 510 may suggest a smaller number of water sensors to install in a condominium with one bathroom, no dishwasher nor in-unit laundry which may indicate a smaller number of potential locations for sources of leaks versus a large home with three bathrooms, a washing machine, and a dishwasher which may indicate a larger number of potential locations for sources of leaks.

Once the optimal water sensor placement location information 550 is determined by the ML model 510, it may be provided to a user device. For example, the server may provide the scored list of optimal water sensor installation locations 550 via a mobile app to mobile device such as mobile device 215, in an email, via a graphical user interface on an AR device (such as the AR viewer device 300), a website, via a chatbot (such as the ML chatbot 450), and/or in any other suitable manner as further described herein.

In one aspect, the owner, renter and/or other party associated with the structure may be entitled to one or more incentives on an insurance policy, security monitoring the water sensors, and/or other products and/or services associated with the structure upon receiving the optimal water sensor placement location information and/or installing one or more water sensors, e.g., in the one or more optimal water sensor placement locations. In one aspect, a business which may offer one or more services to provide optimal water sensor placement locations and/or install the one or more water sensors may offer one or more incentives on their products and/or services, such as an insurance policy, security monitoring, the water sensors, monitoring equipment, and/or other suitable products and/or services which may be associated with a structure. The incentive may include one or more of a discount, a credit, an adjustment, as well as any other suitable incentive.

Exemplary Determination of Optimal Water Sensor Placement Locations

FIG. 6 depicts an exemplary list 600 of optimal water sensor placement locations proximate a structure, according to an embodiment. A server and/or ML model may provide the list 600 to a user device, such as a desktop computer, the mobile device 215, the AR viewer device 300, the ML chatbot 450, and/or any other suitable user device as discussed herein.

According to the example of FIG. 6, the list 600 may indicate that a business Water Sensor Solutions Inc, is providing a water sensor evaluation for a home located at 123 Willis Ave in Chicago, IL using a trained ML model (such as ML model 510). The list 600 may include the structure information 610 associated with the home under evaluation. The structure information 610 may indicate various information which may be used by the trained ML model to generate optimal locations for placement of one or more water sensors 620. The structure information 610 may be publicly available data (e.g., on the internet), provided by the homeowner, input by a representative of the business offering the water sensor evaluation, and/or any other suitable method of obtaining the structure information 610.

The structure information 610 for the home may include the type of structure and when it was built, the square footage of the structure, the number of floors of the home, and the number of bathrooms. The structure information 610 may indicate the floorplan for the home is obtained and may be available to the trained ML model as input to generate the water sensor placement location information 620. The structure information 610 may indicate the type and age of the roof associated with the home. The structure information 610 may indicate information related to the property and other structures which may be present thereupon, such as pools, hot tubs, irrigation systems, and the grading of the land. The structure information 610 may include appliance data for appliances located at the property. The appliance data may include an appliance type (such as washing machine, water heater, dishwasher, refrigerator, sump pump, etc.), appliance age, model type, and/or other information about appliances. The structure information 610 may indicate other data associated with a structure, property, components thereof, plumbing, appliances, etc.

In one embodiment, the structure information 610 may be obtained by a server as described herein, such as server 105, which may be associated with the business, enterprise, and/or other entity offering the optimal placement locations of water sensors for the structure 620. The structure information 610 may be provided as an input by the server to an ML model trained to generate the list 600 of optimal placement locations 620 of water sensors for the home. In one aspect, the ML model may weight different attributes of the structure information 610 to generate the ranked locations 620, such as the location of an appliance and/or potential source of water damage, the age of an appliance, the location of the home, the type of property, etc. During ML model training, the weights applied to one or more attributes of the structure information 610 may be determined, e.g., based upon the training data which may include past water damage claims. For example, the tank water heater is indicated in the structure data 610 as being older than all other pieces of equipment and/or appliances listed, which may increase the likelihood that a water sensor is recommended by the ML model for placement at the water heater, and thus the age of the appliance may be weighted accordingly to increase likelihood the water heater may be a potential source of a leak.

The ML model may provide the optimal water sensor placement locations 620 as a ranked and/or score list. In one aspect, the ML model may determine a score associated with each sensor placement location 620. The score may be associated with potential sources of water damage and/or their associated water sensor placement locations 620. In one example, a regression model may be used to generate the score for each installation locations. The list 600 may indicate that locations 620 with a score above 60 are recommended as optimal locations for installation of a water sensor. The water sensor placement locations 620 may be ranked according to the scores. In one aspect, the list 600 may indicate the number of water sensors to install at the property, which may include water sensors for installation locations 620 which at least meet the requisite score. In the example of FIG. 6, the list 600 indicates seven water sensors have a score above 60, indicating optimal locations for installing a water sensor 620.

In one aspect, one or more installation locations 620 may not exist at the structure. For example, the structure information 610 indicates there is no irrigation system, pool and/or hot tub at the address under evaluation or water sensor installation. Accordingly, the installation locations 620 of the list 600 may indicate these locations have a score of 0 at positions 11 and 12, as they do not exist at the structure. In one embodiment, these entries may be removed from the list 600 due to them not being present at the structure.

While the water sensor placement locations 620 are depicted as a list 600, the sensor placement location information 620 may be provided in any suitable format, such as via a slideshow presentation, AR display, graphical user interface (GUI) such as a map, via an ML chatbot and/or other suitable format, as described further herein.

Exemplary AR Headset to Visualize Water Sensor Placement

Figure 7:
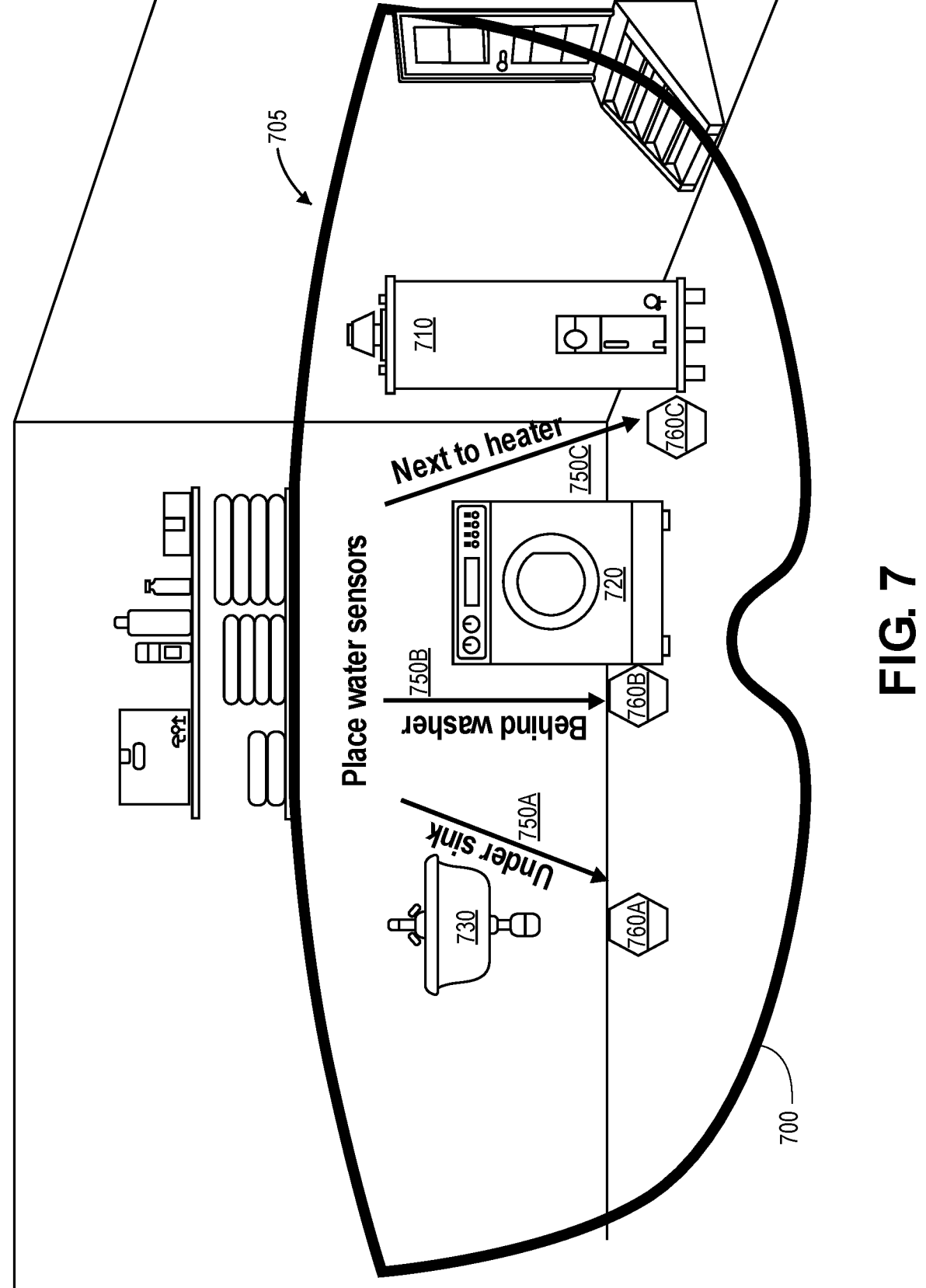
FIG. 7 depicts an exemplary AR display identifying optimized placement locations of water sensors proximate a home, according to one embodiment.

FIG. 7 depicts an exemplary AR headset 700 displaying AR display 705 for identifying optimized placement locations of water sensors proximate a home, according to an embodiment.

In an example according to the embodiment, a trained ML model generates optimal water sensor placement location information based upon structure information for the home. The structure information may indicate that the home is multi-level and including a basement. The structure information may also indicate information for the appliances in the home. In one aspect, the structure information may indicate the make/model, age and/or location (i.e., in the basement) of the water heater 710, washer 720 and utility sink 730. The structure information may be obtained by a server as described herein, which may provide the structure information as an input to a trained ML model (such the ML model 510) to provide an indication of optimal placement locations of water sensors 760 around the home, including the basement. Each of the water heater 710, the washer 720, and/or the utility sink 730 may be connected to a water supply, such that the ML model may indicate areas proximate the water heater 710, the washer 720, and/or the utility sink 730 may be optimal locations to place water sensors 760. The water sensor location placement indication may be provided to the AR headset 700 (e.g., via server 105) as the AR display 705.

The underlay layer device of the AR headset 700, such as underlay layer device 318, may create underlay layer data from the field of view (FOV) of the user of the AR headset 700. In one aspect, the AR headset 700 may be able to recognize the appliances and/or objects in the FOV of the user, such as the water heater 710, washer 720 and utility sink 730. The AR headset 700 may recognize the objects using machine vision, computer vision, AI, ML or any other suitable technique. In one aspect, the AR headset 700 may receive and/or have access to overlay layer data such as structure information residing on a sever, which may include a floorplan of the house, where the appliance, objects and/or sources of water are located, and/or other suitable data.

In one aspect, the AR headset 700 and/or server may correlate the underlay layer data with the overlay later data to create the AR display 705. The AR headset 700 and/or a server in communication with the AR headset 700, may process the underlay layer data and the overlay layer data to recognize objects, their location, the location of the AR headset 700, and/or generate the AR display 705. The AR display 705 may be aligned appropriately with the detected objects based upon sensor data from the AR headset 700, such as gyros, IMUs, accelerometers, GPS, or other suitable means of determining the field of view of the wearer of the AR headset 700.

The AR display 705 may include instructions 750A, 750B, 750C for placing one or more water sensors 760 in the basement. In one aspect, the AR display 705 may include text and/or graphical elements describing placing a water sensor 760 near objects, appliance and/or anything else which the ML model may indicate as potential sources of water damage for the structure. In one example, a server (e.g., server 105), an AR application (e.g., AR application 324) and/or a generative AI/ML model may create the text and/or graphical elements of the AR display 705. For example, AR display 705 may indicate (i) via text and a graphical arrow an instruction 750A to place the water sensor 760C next to the water heater 710; (ii) via text and the graphical arrow the instruction 750B to place the water sensor 760B behind the washer 720; and/or (iii) via text and the graphical arrow the instruction 750C to place the water sensor 760A under the sink 730. The AR headset 700 may detect the user's FOV based upon sensor data of the AR headset 700 to render augmented text and graphics of the AR display 705 on and/or near the associated appliances and water sensor placement locations.

In one aspect, once the user places a water sensor 760 in a location such as an optimal location the ML model indicates, the AR headset 700 may capture underlay layer data of the placed sensor 760 via the underlay layer device. The AR headset 700 and/or server connected to the AR headset 700, such as server 105, may recognize or otherwise detect the water sensor 760 in the underlay layer data, e.g., via object recognition, machine vison, computer vision, AI, ML, or any other suitable means. In response to detecting the water sensor 760, a record associated with the structure in which the water sensor 760 is placed may be created and/or updated to indicate the placement of the water sensor 760. In one example, the record may be a list, file, application and/or other electronic record, e.g., a record which may be kept by the homeowner, a business associated with installing and/or monitoring the water sensor 760, or other entity. The record may be stored in a database on a server such as database 126 of server 105, on a memory of the AR device 700, or any other suitable location.

In one aspect, the AR device 700 via the AR display 705 may include guidance information to a location of the structure associated with the optimal placement location of the one or more water sensors 760 proximate the structure. The guidance information may direct the user through the structure such as a house to one or more optimal locations for water sensor 760 placement. The guidance information may be generated by the server, AR device 700, AI/ML generative chatbot or other suitable source. The guidance information may include visual components, audio components, and/or any other suitable multimedia to guide a user through placement of one or more water sensors 760 proximate a structure. For example, the AR device 700 may use audio and/or text via the AR display 705 to indicate the next location, room, floor, appliance, object, direction of travel, etc., the user should move to for placement of a water sensor 760. The guidance information may be based upon a location of the user determined from the underlay layer day and overlay layer data, for example identifying the room the user is in based upon the underlay layer data and the floorplan of the structure obtained via the structure information.

Exemplary Chatbot for Water Sensor Placement

FIG. 8 depicts an exemplary display 800 employing an ML chatbot for determining optimal placement locations 830 of water sensors for a condominium, according to an embodiment. In one aspect, the chatbot may be accessed by a user via a user device (e.g., a user device 115), communicating with a server (e.g., the server 105) via a network (e.g., the network 110).

In one aspect, the user, Alex, may access the chatbot via a mobile device application "app". A business providing the optimal water sensor placement determination as a service may provide the app and/or ML chatbot to the user. In one example, the only purpose of the app and/or ML chatbot may be to provide optimal locations for water sensor placement for the user. Accordingly, once the application is run the ML chatbot may begin the process of determining an optimal placement location 830 of one or more water sensors for the user. In one example, determining an optimal placement location 830 of one or more water sensors for the user may be one of many functions the app and/or ML chatbot provides, and the user may explicitly request the determination when making the request of the ML chatbot (e.g., by speaking and/or otherwise providing input using natural language), by selecting an icon, menu or the like from the app associated with the determination, or any other suitable means which allows the ML chatbot to detect a request to identify the optimal placement location 830 of one or more water sensors.

The exemplary display 800 provides the structure information 810 for the condominium under evaluation for water sensor placement locations 830. The server and/or ML chatbot may obtain the structure information 810 from one or more sources as described herein, which may not require user input. The ML chatbot may request additional structure information 820 which may not otherwise be available. In the illustrated example, the ML chatbot requests whether the refrigerator at the condominium provides water and/or ice, which requires a water connection and may be relevant to determining whether it may be a potential source of a water leak and/or warrant a water sensor. As another example, the ML chatbot may also request whether the showers in the condominium are steam showers, which may require additional steam-producing equipment having a water connection which may also be a potential source of a water leak and/or warrant a water sensor.

Any part of the structure information 810 may be obtained before or after the ML chatbot is initiated. For example, the structure information 810 may be available to the service provider offering the ML chatbot (e.g., the user is already a customer of the business and structure information 810 related to their condominium is accessible by the business). In one example, the user device accessing the ML chatbot and/or user device may have location services which identify the location of the user device (e.g., via GPS) accessing the ML chatbot and may obtain structure information 810 based upon the location information. In one example, the ML chatbot may collect any part of the structure information 810 from the user, e.g., substantially real-time while the user interacts with the ML chatbot per the requests for additional structure information 820. In one aspect, the ML chatbot may be configured provide the structure information 810 and/or additional structure information 820 to a trained ML model (such as the ML model 510) which generates the indication of optimal water sensor placement locations 830.

The ML chatbot may detect the trained ML model output of the indication of optimal water sensor placement locations 830, e.g., via an electric indication from the server and/or ML chatbot. The ML chatbot may provide the indication of optimal water sensor placement locations 830 to the user in any suitable manner. For example, the ML chatbot may generate a multimedia representation of the optimal placement locations. The multimedia representation may include one or more of: (i) a text component, (ii) an audio component, (iii) an image component, (iv) a video component, (v) a slide component, (vi) a VR component, (vii) an AR component, (viii) a mixed reality component, (ix) a multimedia component, and/or (x) a metaverse component.

As shown in FIG. 8, the ML chatbot may provide a list of recommendations for optimal placement locations 830 of four water sensors. The ML chatbot may rank, score, prioritize locations and/or remove locations which do not exist from the list 830 or any other multimedia representation, as described herein with respect to other embodiments.

The ML chatbot may also generate visual depictions 850 of the water sensor placement locations overlaid on a floorplan 840 of the condominium. The visual depictions 850 may correspond to the recommended installation locations provided by the ML chatbot via the list 830. In one aspect, the ML chatbot may also generate guidance information (not depicted) on the floorplan 840 indication a route to the water sensor placement locations. In some embodiments, the guidance information may be generated as described herein, e.g., with respect to the AR headset 700 embodiment of FIG. 7.

While the water sensor placement locations are depicted as a list 830 and floorplan 840, the sensor placement location information may be provided in any suitable format, such as via a slideshow presentation, AR display, and/or other suitable format, as described further herein.

Exemplary Computer-Implemented Method for Determining an Optimal Placement Location of Water Sensors Using ML FIG. 9 depicts a flow diagram of an exemplary computer-implemented method 900 for determining an optimal placement location of one or more water sensors proximate a structure using ML, according to one embodiment. One or more steps of the method 900 may be implemented as a set of instructions stored on a computer-readable memory and executable on one or more processors. The method 900 of FIG. 9 may be implemented via the environment 100.

The computer-implemented method 900 for determining an optimal placement location of one or more water sensors proximate a structure using ML may include (1) at block 910 obtaining, by one or more processors, structure information for a structure at which the one or more water sensors are to be placed; (2) at block 920 providing, by the one or more processors, the structure information to a trained machine learning model to generate an indication of the optimal placement location of the one or more water sensors proximate the structure, wherein (i) the trained machine learning model may be trained using historical water damage claims data, (ii) the historical water damage claims data may include a geographic location of a structure associated with the corresponding historical water damage claims data, (iii) the trained machine learning model may be configured to learn a relationship between building code requirements for the geographic locations and potential sources of water damage, and/or (iv) the optimal placement location of the one or more water sensors may correspond to the potential sources of water damage; and/or (3) at block 930 providing, by the one or more processors, the indication of the optimal placement location of the one or more water sensors proximate the structure to a user device.

For instance, in one embodiment of the computer-implemented method 900, the structure information may include data associated with one or more of a floorplan of the structure, structural components of the structure, a property the structure is located upon, plumbing at the structure, and/or appliances at the structure. The structure information may include a geographic location of the structure.

In one embodiment of the computer-implemented method 900, the ML model may further be configured to weight one or more attributes of the structure information. In one embodiment of the computer-implemented method 900, the ML model may further be configured to determine a score associated with the potential sources of water damage and rank the potential sources of water damage.

In one embodiment, the computer-implemented method 900 may further include determining, by the one or more processors, a number of water sensors to place proximate the structure and providing, by the one or more processors to the user device, a number of ranked potential sources of water damage which correspond to the number of water sensors to place proximate the structure.

In one embodiment, the computer-implemented method 900 may further include removing, by the one or more processors, one or more optimal placement locations which do not exist at the structure.

In one embodiment of the computer-implemented method 900, the ML model may include a regression model. In one embodiment of the computer-implemented method 900, the ML model may include an algorithm including one or more or k-nearest neighbor, support vector regression, and/or random forest.

In one embodiment of the computer-implemented method 900, the historical water damage claims data may indicate one or more of a source of water damage, a cause of the water damage, a location of the water damage, and/or a type of structure where the water damage occurred.

It should be understood that not all blocks of the exemplary flow diagram of method 900 are required to be performed. Moreover, the exemplary flow diagram of method 900 is not mutually exclusive of methods 1000, 1100 (e.g., block(s) from the exemplary flow diagram of FIG. 9 may be performed in exemplary methods of flow diagram FIGS. 10 and 11).

Exemplary Computer-Implemented Method of Using Ar for Visualizing an Optimal Placement Location of Water Sensors Using ML FIG. 10 depicts a flow diagram of an exemplary computer-implemented method 1000 of using AR for visualizing an optimal placement location of one or more water sensors proximate a structure, according to one embodiment. One or more steps of the method 1000 may be implemented as a set of instructions stored on a computer-readable memory and executable on one or more processors. The method 1000 of FIG. 10 may be implemented via an AR device, such as AR device 300. In some embodiments, the AR device may include a separate base unit and a viewer device. In other embodiments, the AR device is a viewer de-vice that integrates the base unit functionality into the viewer device itself.

The computer-implemented method 1000 of using AR for visualizing an optimal placement location of one or more water sensors proximate a structure may include: (1) at block 1010 receiving, with one or more processors, underlay layer data indicative of a field of view associated with an AR viewer device; (2) at block 1020 receiving, with the one or more processors, overlay layer data including an indication of the optimal placement location of the one or more water sensors proximate the structure; (3) at block 1030 correlating, with the one or more processors, the overlay layer data with the underlay layer data; (4) at block 1040 creating, with the one or more processors, an AR display based upon the correlation, the AR display including an instruction for the placing the one or more water sensors; and/or (5) at block 1050 displaying, with the one or more processors, the AR display to a user via the AR viewer device.

For instance, in one embodiment of the computer-implemented method 1000, the underlay layer data may be generated by a camera coupled to the AR viewer device.

In one embodiment of the computer-implemented method 1000, the indication of the optimal placement location of the one or more water sensors proximate the structure may be generated by a trained ML model.

In one embodiment of the computer-implemented method 1000, correlating the overlay layer data with the underlay layer data may include identifying, by the one or more processors, a location associated with the structure based upon the field of view associated with the AR viewer device and querying, by the one or more processors, the overlay layer data to determine that the location is included in the indication of the optimal placement location of the one or more water sensors proximate the structure.

In one embodiment of the computer-implemented method 1000, creating the AR display may include text and/or graphical elements describing placing a water sensor near the object.

In one embodiment, the computer-implemented method 1000 may include detecting, by the one or more processors, the one or more water sensors in the underlay data and responsive to detecting the one or more water sensor in the underlay data, updating, by the one or more processors, a record associated with the structure to indicate the placement of the water sensor.

In one embodiment, the computer-implemented method 1000 may include generating, by the one or more processors, guidance information to a location of the structure associated with the optimal placement location of the one or more water sensors proximate the structure, wherein creating the AR display may include the guidance information.

In one embodiment, the computer-implemented method 1000 may include determining, by the one or more processors, a number of water sensors to place proximate the structure and providing, by the one or more processors via the AR display, a number of ranked potential sources of water damage which correspond to the number of water sensors to place proximate the structure.

In one embodiment, the computer-implemented method 1000 may include removing, by the one or more processors, one or more optimal placement locations which do not exist at the structure.

It should be understood that not all blocks of the exemplary flow diagram of method 1000 are required to be performed. Moreover, the exemplary flow diagram of method 1000 is not mutually exclusive of methods 900, 1100 (e.g., block(s) from the exemplary flow diagram of FIG. 10 may be performed in the methods of exemplary flow diagram FIGS. 9 and 11).

Exemplary Computer-Implemented Method for Determining an Optimal Placement Location of Water Sensors Using an ML Chatbot FIG. 11 depicts a flow diagram of an exemplary computer-implemented method 1100 for determining an optimal placement location of one or more water sensors proximate a structure using an ML chatbot, according to one embodiment. One or more steps of the method 1100 may be implemented as a set of instructions stored on a computer-readable memory and executable on one or more processors. The method 1100 of FIG. 11 may be implemented via the environment 100.

The computer-implemented method 1100 for determining an optimal placement location of one or more water sensors proximate a structure using an ML chatbot may include (1) at block 1110 obtaining, by one or more processors, structure information for a structure at which the one or more water sensors are to be placed; (2) at block 1120 detecting, by the one or more processors via the ML chatbot, a request to identify the optimal placement location of the one or more water sensors proximate the structure; (3) at block 1130 in response to detecting the request, providing, by the one or more processors, the structure information to a trained machine learning model to generate an indication of the optimal placement location of the one or more water sensors proximate the structure, wherein: (i) the trained machine learning model is trained using historical water damage claims data, (ii) the optimal placement location of the one or more water sensors corresponds to the potential sources of water damage, and/or (iii) the ML chatbot is configured to input the structure information into the ML chatbot to provide the structure information to the trained machine learning model; (4) at block 1140 detecting, by the one or more processors via the ML chatbot, an output of the trained machine learning model that includes the indication of the optimal placement location of the one or more water sensors proximate the structure; and/or (5) at block 1150 providing, by the one or more processors, an indication of the optimal placement location of the one or more water sensors proximate the structure to a user device.

For instance, in one embodiment of the computer-implemented method 1100, obtaining the structure information may include generating, by the one or more processors via the ML chatbot, one or more requests for supplemental information based upon the structure information; providing, by the one or more processors via the ML chatbot, the one or more requests for the supplemental information to the user device; and responsive to providing the one or more requests for supplemental information, receiving, by the one or more processors via the ML chatbot from the user device, the supplemental information, wherein the structure information includes the supplemental information.

In one embodiment of the computer-implemented method 1100, the structure information may include data associated with one or more of: (i) a floorplan of the structure, (ii) structural components of the structure, (iii) a property the structure is located upon, (iv) plumbing at the structure, and/or (v) appliances at the structure. In one embodiment of the computer-implemented method 1100, the structure information includes a geographic location of the structure.

In one embodiment of the computer-implemented method 1100, the historical water damage claims data includes a geographic location of a structure associated with the corresponding historical water damage claims data, and the trained machine learning model is configured to learn a relationship between building code requirements for the geographic locations and potential sources of water damage.

In one embodiment, the computer-implemented method 1100, providing the indication of the optimal water placement of the one or more water sensors to the user device may include generating, by the one or more processors via the ML chatbot, a multimedia representation of the optimal placement location of the one or more water sensors proximate the structure based upon the indication of the optimal placement location of the one or more water sensors proximate the structure; and providing, by the one or more processors, the multimedia representation of the optimal placement location of the one or more water sensors proximate the structure to the user device. The multimedia representation may include one or more of: (i) a text component, (ii) an audio component, (iii) an image component, (iv) a video component, (v) a slide component, (vi) a virtual reality component, (vii) an augmented reality component, (viii) a mixed reality component, (ix) a multimedia component, and/or (x) a metaverse component.

In one embodiment of the computer-implemented method 1100, the ML chatbot may be trained using one or more of: (i) supervised learning, (ii) unsupervised learning, and/or (iii) reinforcement learning.

In one embodiment of the computer-implemented method 1100, providing the indication of the optimal placement location of the one or more water sensors to the user device may include generating, by the one or more processors, guidance information to a location of the structure associated with the optimal placement location of the one or more water sensors proximate the structure; and providing, by the one or more processors, the guidance information.

In one embodiment of the computer-implemented method 1100, providing the indication of the optimal placement location of the one or more water sensors to the user device may include determining, by the one or more processors, the number of water sensors to place proximate the structure; and providing, by the one or more processors, a ranked list of optimal placement locations which correspond to the number of water sensors to place proximate the structure. In one embodiment, the computer-implemented method 1100 may include removing, by the one or more processors, from the ranked list one or more optimal placement locations which do not exist at the structure.

It should be understood that not all blocks of the exemplary flow diagram of method 1100 are required to be performed. Moreover, the exemplary flow diagram of method 1100 is not mutually exclusive of methods 900, 1000 (e.g., block(s) from the exemplary flow diagram of FIG. 11 may be performed in the methods of exemplary flow diagram FIGS. 9 and 10).

ADDITIONAL CONSIDERATIONS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method for determining an optimal placement location of one or more water sensors proximate a structure using machine learning, the method comprising:

obtaining, by one or more processors, structure information for a structure at which the one or more water sensors are to be placed;

providing, by the one or more processors, the structure information to a trained machine learning model to generate an indication of the optimal placement location of the one or more water sensors proximate the structure, wherein:

the trained machine learning model is trained using historical water damage claims data, the historical water damage claims data includes a geographic location of a structure associated with the corresponding historical water damage claims data, the trained machine learning model is configured to learn a relationship between building code requirements for the geographic locations and potential sources of water damage, and the optimal placement location of the one or more water sensors corresponds to the potential sources of water damage; and providing, by the one or more processors, the indication of the optimal placement location of the one or more water sensors proximate the structure to a user device.

2. The computer-implemented method of claim 1, wherein the structure information includes data associated with one or more of a floorplan of the structure, structural components of the structure, a property the structure is located upon, plumbing at the structure, and/or appliances at the structure.

3. The computer-implemented method of claim 1, wherein the structure information includes a geographic location of the structure.

4. The computer-implemented method of claim 1, wherein the machine learning model is further configured to weight one or more attributes of the structure information.

5. The computer-implemented method of claim 1, wherein the machine learning model is further configured to:

determine a score associated with the potential sources of water damage; and rank the potential sources of water damage.

6. The computer-implemented method of claim 1, further comprising:

determining, by the one or more processors, a number of water sensors to place proximate the structure; and providing, by the one or more processors to the user device, a number of ranked potential sources of water damage which correspond to the number of water sensors to place proximate the structure.

7. The computer-implemented method of claim 1, further comprising removing, by the one or more processors, one or more optimal placement locations which do not exist at the structure.

8. The computer-implemented method of claim 1, wherein the machine learning model includes a regression model.

9. The computer-implemented method of claim 1, wherein the machine learning model includes an algorithm including one or more or k-nearest neighbor, support vector regression, and/or random forest.

10. The computer-implemented method of claim 1, wherein the historical water damage claims data indicates one or more of a source of water damage, a cause of the water damage, a location of the water damage, and/or a type of structure where the water damage occurred.

11. A computer system for determining an optimal placement location of one or more water sensors proximate a structure using machine learning, the system comprising:

one or more processors; and one or more non-transitory memories storing processor-executable instructions that, when executed by the one or more processors, cause the system to:

obtain structure information for a structure at which the one or more water sensors are to be placed;

provide the structure information to a trained machine learning model to generate an indication of the optimal placement location of the one or more water sensors proximate the structure, wherein:

the trained machine learning model is trained using historical water damage claims data, the historical water damage claims data includes a geographic location of a structure associated with the corresponding historical water damage claims data, the trained machine learning model is configured to learn a relationship between building code requirements for the geographic locations and potential sources of water damage, and the optimal placement location of the one or more water sensors corresponds to the potential sources of water damage; and provide the indication of the optimal placement location of the one or more water sensors proximate the structure to a user device.

12. The computer system of claim 11, wherein the structure information includes data associated with one or more of a floorplan of the structure, structural components of the structure, a property the structure is located upon, plumbing at the structure, and/or appliances at the structure.

13. The computer system of claim 11, wherein the structure information includes a geographic location of the property.

14. The computer system of claim 11, wherein the machine learning model is further configured to weight one or more attributes of the structure information.

15. The computer system of claim 11, wherein the machine learning model is further configured to:

determine a score associated with the potential sources of water damage; and rank the potential sources of water damage.

16. The computer system of claim 11 further comprising instructions that, when executed by the one or more processors, cause the system to:

determine a number of water sensors to place proximate the structure; and provide a number of ranked potential sources of water damage which correspond to the number of water sensors to place proximate the structure to the user device.

17. The computer system of claim 11 further comprising instructions that, when executed by the one or more processors, cause the system to remove one or more optimal placement locations which do not exist at the property.

18. The computer system of claim 11, wherein the machine learning model includes a regression model.

19. The computer system of claim 11, wherein the historical water damage claims data indicates one or more of a source of water damage, a cause of the water damage, a location of the water damage, and/or a type of structure where the water damage occurred.

20. A non-transitory computer-readable medium storing processor-executable instructions that, when executed by one or more processors, cause the one or more processors to:

obtain structure information for a structure at which one or more water sensors are to be placed;

provide the structure information to a trained machine learning model to generate an indication of an optimal placement location of the one or more water sensors proximate the structure, wherein:

the trained machine learning model is trained using historical water damage claims data, the historical water damage claims data includes a geographic location of a property associated with the corresponding historical water damage claims data, the trained machine learning model is configured to learn a relationship between building code requirements for the geographic locations and potential sources of water damage, and the optimal placement location of the one or more water sensors corresponds to the potential sources of water damage; and provide the indication of the optimal placement location of the one or more water sensors proximate the structure to a user device.

* * * * *